United States Patent
Gu et al.

(10) Patent No.: US 6,639,685 B1
(45) Date of Patent: Oct. 28, 2003

(54) IMAGE PROCESSING METHOD USING PHASE-SHIFTED FRINGE PATTERNS AND CURVE FITTING

(75) Inventors: Jie Gu, Grand Blanc, MI (US); Simon Chin-Yu Tung, Rochester Hills, MI (US); Gary C. Barber, Novi, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/512,383

(22) Filed: Feb. 25, 2000

(51) Int. Cl.[7] .............................. G01B 11/24; G06K 9/36

(52) U.S. Cl. ...................... 356/603; 356/604; 382/286

(58) Field of Search ................................ 382/154, 286; 356/602–605

(56) References Cited

U.S. PATENT DOCUMENTS

| | | | |
|---|---|---|---|
| 4,349,277 A | 9/1982 | Mundy et al. | |
| 4,641,972 A | 2/1987 | Halioua et al. | |
| 4,657,394 A | 4/1987 | Halioua | |
| 4,722,600 A | 2/1988 | Chiang | |
| 5,069,548 A | 12/1991 | Boehnlein | |
| 5,202,749 A | 4/1993 | Pfister | |
| 5,307,152 A | 4/1994 | Boehnlein et al. | |
| 5,343,410 A | 8/1994 | Tsujiuchi et al. | |
| 5,406,342 A | 4/1995 | Jongsma | |
| 5,450,204 A | 9/1995 | Shigeyama et al. | |
| 5,608,405 A * | 3/1997 | Pritt ............................ | 342/25 |
| 5,612,786 A | 3/1997 | Huber et al. | |
| 5,671,042 A | 9/1997 | Sciammarella | |
| 5,825,495 A | 10/1998 | Huber | |
| 6,049,384 A * | 4/2000 | Rudd et al. .................. | 356/603 |
| 6,208,416 B1 * | 3/2001 | Huntley et al. ............. | 356/512 |
| 6,438,272 B1 * | 8/2002 | Huang et al. ............... | 382/386 |

OTHER PUBLICATIONS

H. Takasaki, 1970, "Moire Topography," Appl. Opt., vol. 9, 1467–1472.

D.M. Meadows, W.O. Johnson, J.B. Allen, 1970, "Generation of Surface Contours by Moire Patterns," Appl. Opt., vol. 9, 942–947.

(List continued on next page.)

Primary Examiner—Zandra V. Smith
(74) Attorney, Agent, or Firm—Kathryn A. Marra

(57) ABSTRACT

A contour measurement system determines three dimensional surface information of an object using a projection moiré technique to obtain a single fringe pattern that is analyzed using a phase-shift image processing method. A grating is projected onto the object and the reflected fringe pattern is recorded by a camera and stored digitally as an array of pixels. An estimated fringe spacing is then determined for each pixel. Using the estimated fringe spacings, four phase-shifted fringe patterns are generated by correlation integration and then used in a phase calculation to obtain wrapped phase information for the object. This phase information is then unwrapped and normalized, producing a set of data points representative of the unwrapped phase information. Noise suppression using pattern reconstruction and smoothing can be utilized at this point to improve the signal to noise ratio. Thereafter, updated estimated spacings are determined for each data point using a curve fitting function such as a localized least squares fit. The system then performs one or more additional iterations of the correlation integration, phase calculation, unwrapping, noise suppression, and fringe spacing update steps, each time using the newest updated estimated spacing in the correlation integration. After the final iteration, the unwrapped phase information is demodulated and used to calculate the three dimensional coordinates of points on the object surface. A fractional pixel analysis technique is also disclosed for use in the correlation integration and updated estimated spacing calculations.

42 Claims, 11 Drawing Sheets

OTHER PUBLICATIONS

J. Hovanesian, Y. Hung, 1971, "Moire Contour–Difference, and Vibration Analysis of Arbitrary Objects," Appl. Opt., vol. 10, 2734.

M. Idesawa, T. Yatagai, T. Soma, 1977, "Scanning moiré method and automatic measurement of 3–D shapes," Appl. Opt., vol. 6, No. 8,2152–2162.

G. Indebetouw, 1978, "Profile measurement using projection of running fringes," Appl. Opt., vol. 17, 2930–2933.

M. Takeda, K. Mutoh, 1983, "Fourier transform profilometer for the automatic measurement of 3–D object shapes," Appl. Opt., vol. 22, 3977–3982.

V. Srinivasan, H. Liu, M. Halioua, 1984, "Automated phase measuring profilometry of 3–D diffuse objects," Appl. Opt., vol. 23,No. 18, 3105–3108.

V. Srinivasan, H. Liu, M. Halioua, 1985, "Automated phase measuring profilometry: a phase mapping approach," Appl. Opt., vol. 24, No. 2, 185–188.

X. Peng, S. Zhou, Z. Gao, 1995, "An automatic demodulation technique for a non–linear carrier fringe pattern," Optik, 100, No. 1, 11–14.

M. Servin, F. Cuevas, 1995, "A novel technique for spatial phase shifting interferometry," J. of Modern Optics, vol. 42, No. 9, 1853–1862.

X. Peng, Z. Gao, S. Zhou, 1995, "Surface contouring by a new type of digital moire technique," Optik, 100, No. 2, 63–67.

J. Bruning, D. Herriott, J. Gallagher, D. Rosenfeld, A. White, D. Brangaccio, 1974, "Digital Wavefront Measuring Interferometer for Testing Optical Surfaces and Lenses," Appl. Opt., vol. 13, No. 11, 2693–2703.

K. Creath, 1985, "Phase–Shifting Interferometry," Appl. Opt., vol. 24, No. 18, 3053–3058.

S. Nakadate, Saito, 1985, "Fringe Scanning Speckle–Pattern Interferometry," Appl. Opt., vol. 24, No. 14, 2172–2180.

T. Kreis, 1986, "Digital holographic Interference–phase measurement using the Fourier–transform method," J. Opt., Soc. Am. A, vol. 3, No. 6, 847–855..

M. Kujawinska, L. Salbut, K. Patorski, 1991, "Three–Channel Phase Stepped System for Moiré Interferometry," Appl. Opt., vol. 30, No. 13, 1633–1635.

P. Plotkowski, Y. Hung, J. Hovansian, G. Gerhart, 1985 "Improvement Fringe Carrier Technique for Unambiguous Determination of Holographically Recorded Displacements," Opt. Eng., vol. 24, No. 5, 754–756.

T. Yatagai, S. Inaba, H. Nakano, M. Suzuki, 1984, "Automatic Flatness Tester for Very Large Scale Integrated Circuit Wafers," Opt. Eng., vol. 23, No. 4, 401–405.

C. Sciammarella, J. Gilbert, 1976, "A Holographic–Moiré Technique to Obtain Separate Patterns for Components of Displacement," Exp. Mech., vol. 16, 215–219.

M. Takeda, H. Ina, S. Kobayashi, 1982, "Fourier–transform method of fringe–pattern analysis for computer–based topography and interferometry," J. Opt. Soc. Am., vol. 72, No. 1, 156–160.

M. Takeda, Q. Ru, 1985, "Computer–based Sensitive Electron–wave Interferometry," Appl. Opt., vol. 24, No. 18, 3068–3071.

M. Takeda, K. Mutoh, 1983, "Fourier Transform Profilometry for the Automatic Measurement of 3–D Object Shapes," Appl. Opt., vol. 22, No. 24, 3977–3982.

D. Bone, H. Bachor, R. Sandeman, 1986, "Fringe–Pattern Analysis Using a 2–D Fourier Transform," Appl. Opt., vol. 25, No. 10, 1653–1660.

J. Gu, F. Chen, 1995, "Fast Fourier transform, iteration, and least–squares–fit demodulation image processing for analysis of single–carrier fringe pattern," J. Opt. Soc. Am. A, vol. 12, No. 10, 2159–2164.

K. H. Womack, 1984, "Interferometric phase measurement usig spatial synchronous detection," Optical Engineering, vol. 23, No. 4, 391–395.

S. Tyooka, M. Tominaga, 1984, "Spatial Fringe Scanning for Optical Phase Measurement," vol. 51, No. 2, 68–70.

S. Tyooka, Y. Iwaasa, M. Kawahashi, K. Hosoi, M. Suzuki, 1985, "Automatic Processing of Young's Fringes in Speckle Photography," Opt. Lasers Eng., vol. 6, 203–212.

S. Tang, Y. Hung, 1990, "Fast profilometer for the automatic measurement of 3–D object shapes," Appl. Opt., vol. 29, No. 20, 3012–3018.

M. Kujawinska, 1993 "Spacial Phase Measurement Methods," in Interferogram Analysis, IOPP, D. Robinson and G. Reid ed., Chapter 5, 180–185.

J. Gu, Y. Shen, 1997, "Iteration of phase window correlation and least–squares fit for Young's fringe pattern processing," Appl. Opt., vol. 36, No. 4, 793–799.

J. Gu, Y. Hung, F. Chen, 1994, "Iteration algorithm for computer–aided speckle interferometry," Appl. Opt., vol. 33, No. 23, 5308–5317.

Y. Ichioka, M. Inuiya, 1972, "Direct Phase Detecting System," Appl. Opt., vol. 11, No. 7, 1507–1514.

D. Slough, O. Kwon, D. Leary, 1990, "High–speed interferometric measurement of aerodynamic phenomena," Proc. SPIE, vol. 1221, 394–403.

M. Pirga, M. Kujawinska, 1995, "Two directional spatial––carrier phase–shifting method for analysis of crossed and closed fringe patterns," Opt. Eng., vol. 34, No. 8, 2459–2466.

D. W. Robinson, "Automatic fringe analysis with a computer image–processing system," Appl. Opt., vol. 22, No. 14, 2169–2176 (1983).

J. M. Huntley, "An image processing system for the analysis of speckle photographs," J. Phys. E. 19, 43–48 (1986).

J. M. Huntley, "Speckle photography fringe analysis by the Walsh transform," Appl. Opt., vol. 25, No. 3, 382–386 (1986).

D. J. Chen and F. P. Chiang, "Digital processing of Young's fringes in speckle photography," Opt. Eng., vol. 29, No. 11, 1413–1420 (1990).

J. M. Huntley, "Maximum–likelihood analysis of speckle photography fringe patterns," Appl. Opt. 31, 4834–4838 (1992).

J. Gu, "Phase Iteration and Spacing Iteration Algorithms for Speckle Fringe Pattern Processing," Opt Lasers Engng. 29, 145–158 (1998).

J. Gu, F. Chen 1996, "Fourier–transformation, phase–iteration, and least–square–fit image processing for Young's fringe pattern," Appl. Opt., vol. 35, No. 2, 232–239.

G. Kaufmann, 1993, "Automatic Fringe Analysis Procedures in Speckle Metrology," Spec. Metr., R. Sirohi, Chapter 9, 427–473.

V. Vlad, D. Malacara, 1994, "Direct Spatial Reconstruction of Optical Phase from Phase–Modulated Images," Prog. Opt., vol. 33, No. 4, 265–313.

* cited by examiner

IMAGE PROCESSING METHOD USING PHASE-SHIFTED FRINGE PATTERNS AND CURVE FITTING

TECHNICAL FIELD

The present invention relates generally to image processing techniques for fringe pattern analysis and, in particular, to optical measurement techniques that utilize phase-shift analysis of a fringe pattern to extract information contained within the fringe pattern.

BACKGROUND OF THE INVENTION

There are three basic types of fringe patterns used in optical metrology: carrier patterns, Young's patterns, and phase-shifted patterns. With the continuing advances in image capturing capabilities and increased processing power available from computers and other digital processing devices, automated processes for interpretation of these different types of fringe patterns are continually being developed and refined.

In carrier pattern processing techniques, carrier fringes are utilized to obtain modulated information fringes. The carrier is demodulated afterward in order to retrieve the desired information. See, for example, P. Plotkowski, Y. Hung, J. Hovansian, G. Gerhart, 1985 ("Improvement Fringe Carrier Technique for Unambiguous Determination of Holographically Recorded Displacements," Opt. Eng., Vol. 24, No. 5, 754–756); T. Yatagai, S. Inaba, H. Nakano, M. Suzuki, 1984 ("Automatic Flatness Tester for Very Large Scale Integrated Circuit Wafers," Opt. Eng., Vol. 23, No. 4, 401–405); and C. Sciammarella, J. Gilbert, 1976 ("A Holographic-Moiré Technique to Obtain Separate Patterns for Components of Displacement," Exp. Mech., Vol. 16, No. 6., 215–219). In these techniques both the pure carrier pattern and modulated pattern are utilized so that the difference can be calculated. See, also, U.S. Pat. No. 5,671,042, issued Sep. 23, 1997 to C. A. Sciammarella, which discloses a holographic moiré interferometry technique using images taken before and after object deformation for purposes of strain measurement.

Another carrier pattern processing approach is the Fourier Transform Method (FTM). See, for example, M. Takeda, H. Ina, S. Kobayashi, 1982 ("Fourier-Transform Method of Fringe-Pattern Analysis for Computer-Based Topography and Interferometry," J. Opt. Soc. Am., Vol. 72, No. 1, 156–160), and M. Takeda, Q. Ru, 1985 ("Computer-based Sensitive Electron-wave Interferometry," Appl. Opt., Vol. 24, No. 18, 3068–3071). This FTM approach can be used with single patterns and involves removing the carrier by shifting the spectrum in the frequency domain. However, this spectrum shift introduces error and requires that the carrier fringes be equally spaced. M. Takeda, K. Mutoh, 1983 ("Fourier Transform Profilometry for the Automatic Measurement of 3-D Object Shapes," Appl. Opt., Vol. 22, No. 24, 3977–3982) discloses another FTM approach in which carrier information is pre-saved in a computer and the carrier is then removed in the spatial domain. D. Bone, H. Bachor, R. Sandeman, 1986 ("Fringe-Pattern Analysis Using a 2-D Fourier Transform," Appl. Opt., Vol. 25, No. 10, 1653–1660A) discloses a refinement of FTM that involves introducing a nonlinear response function and suggests using pure carrier fringe area for carrier demodulation. Yet another refinement is disclosed in J. Gu, F. Chen, 1995 ("Fast Fourier Transformation, Iteration, and Least-Square-Fit Demodulation Image Processing or Analysis of Single-Carrier Fringe Pattern," JOSA. Am. A, Vol. 12, No. 10, 2159–2164). This modified FTM technique uses iteration and a global least squares fit to construct the phase of the carrier.

Processing of Young's patterns is commonly carried out in speckle metrology to obtain optical measurements of deformed objects, including measurements of slope, displacement, strain, and vibration. In speckleometry, two exposures are recorded on a specklegram—one before and one after the object being measured is deformed. The specklegram is then probed pointwise by a narrow laser beam and the resulting Young's fringes are displayed in a diffraction field behind the specklegram. Various automated systems and algorithms have been proposed, including one-dimensional integration, one-dimensional autocorrelation, one-dimensional and two-dimensional Fourier transformation, two-dimensional Walsh transformation, and maximum-likelihood techniques. See, for example, D. W. Robinson, 1983 ("Automatic Fringe Analysis with a Computer Image Processing System," Appl. Opt. 22, 2169–2176); J. M. Huntley, 1986 ("An Image Processing System for the Analysis of Speckle Photographs," J.Phys.E. 19, 43–48); D. J. Chen and F. P. Chiang, 1990 ("Digital Processing of Young's Fringes in Speckle Photography," Opt. Eng. 29, 1413–1420); J. M. Huntley, 1989 ("Speckle Photography Fringe Analysis by the Walsh Transform," Appl. Opt. 25, 382–386); and J. M. Huntley, 1992 ("Maximum-Likelihood Analysis of Speckle Photography Fringe Patterns," Appl. Opt. 31, 4834–4838). A whole-field processing approach to analyzing Young's patterns has been proposed by J. Gu, F. Chen, 1996 ("Fourier-Transformation, Phase-Iteration, and Least-Square-Fit Image Processing for Young's Fringe Pattern," Appl. Opt. 35, 232–239). In the proposed process, two-dimensional fast-Fourier transform (FFT) filtering of a Young's pattern is used to produce data for an initial phase calculation, following which phase iteration can be used to improve the phase, if desired or necessary. Finally, a global least-squares regression is carried out to fit the phase to a reference plane.

Synchronous detection has been used in processing of carrier and Young's patterns. See, for example, K. H. Womack, 1984 ("Interferometric Phase Measurement Using Spatial Synchronous Detection," Optical Engineering, Vol. 23, No. 4, 391–395); S. Toyooka, M. Tominaga, 1984 ("A Spatial Fringe Scanning for Optical Phase Measurement"); S. Toyooka, Y. Iwaasa, M. Kawahashi, K. Hosoi, M. Suzuki, 1985 ("Automatic Processing of Young's Fringes in Speckle Photography," Opt. Lasers Eng., Vol. 6, 203–212); S. Tang, Y. Hung, 1990 ("Fast Profilometer for the Automatic Measurement of 3-D Object Shapes," Appl. Opt., Vol. 29, No. 20, 3012–3018); and M. Kujawinska, 1993 ("Spatial Phase Methods in Interferogram Analysis," IOPP, D. Robinson and G. Reid eds., Chapter 5, 180–185).

Synchronous methods utilize a reference spacing for correlation calculation. Generally, the accuracy of the method is determined by how close the reference spacing and the real fringe spacing are to each other. Synchronous methods typically start with either estimating a reference spacing or assuming that the reference spacing is equal to the carrier fringe spacing. Because of the mismatch between the reference spacing and the actual fringe spacing, the method has limited application. As discussed in J. Gu, Y. Shen, 1997 ("Iteration of Phase Window Correlation and Least Square Fit for Young's Fringe Pattern Processing," Appl. Opt., Vol. 36, No. 4, 793–799), synchronous detection can be combined with a least squares fit. Iterations of these two steps and the phase calculation provide good accuracy for Young's pattern analysis. However, this iteration method is applicable only to equal-spaced fringe patterns and is not useful in analyzing unequally spaced fringe patterns, such as exist when projection fringe patterns are used in three-dimensional (3-D) surface contour measurement.

For purposes of 3-D surface contour measurement, a number of optical projection fringe pattern techniques have been proposed. For example, moiré techniques can be used to obtain surface contour maps, as disclosed in H. Takasaki, 1970 ("Moiré Topography," *Appl. Opt.*, Vol. 9, 1467–1472); D. M. Meadows, W. O. Johnson, J. B. Allen, 1970 ("Generation of Surface Contours by Moiré Patterns," *Appl. Opt.*, Vol. 9, 942–947); and J. Hovanesian, Y. Hung, 1971 ("Moiré Contour-Sum Contour-Difference, and Vibration Analysis of Arbitrary Objects," *Appl. Opt.*, Vol. 10, 2734). As is known, a moiré fringe pattern is obtained when a reference grating is superimposed over another grating. Projection moiré techniques often utilize a projection of light through a first grating, with the light then being reflected off the object being measured and then viewed through a second grating. See, for example, U.S. Pat. No. 5,307,152, issued April 26, 1994 to A. Broehnlein et al. As disclosed by this patent, phase-shifting interferometry techniques can be used along with the moiré fringe patterns to obtain surface contour information. See also, U.S. Pat. No. 5,202,749, issued Apr. 13, 1993 to K. Pfister, and U.S. Pat. No. 5,069,548, issued Dec. 3, 1991 to A. Boehnlein.

Apart from these dual-grating projection moiré techniques, phase-shifted fringe pattern processing techniques using only a single grating have been proposed for 3-D surface contour measurement. One such common phase-shift technique utilizes four phase-shifted patterns with 90° phase differences. See, for example, J. Bruning, D. Herriott, J. Gallagher, D. Rosenfeld, A. White, D. Brangaccio, 1974 ("Digital Wavefront Measuring Interferometer for Testing Optical Surfaces and Lenses," *Appl. Opt.*, Vol. 13, No. 11, 2693–2703); K. Creath, 1985 ("Phase-Shifting Interferometry," *Appl. Opt.*, Vol. 24, No. 18, 3053–3058); and U.S. Pat. No. 5,450,204, issued Sept. 12, 1995 to Y. Shigeyama et al. The phase-shifting can be accomplished physically (i.e., mechanically or otherwise), as in the Shigeyama et al. and Halioua et al. patents, or can be artificially generated from a single image, as discussed in [J. Gu, F. Chen 1996] noted above.

3-D contour measurement systems have also been proposed that use three 120° phase shifts, as disclosed in U.S. Pat. No. 4,641,972, issued Feb. 10, 1987 to M. Halioua et al. A two-image phase-shift technique is also known which uses a fast Fourier transformation (FFT) to remove the DC part. See, for example, T. Kreis, 1986 ("Digital Holographic Interference-Phase Measurement Using the Fourier-Transform Method," *J. Opt., Soc. Am. A*, Vol. 3, No. 6, 847–855). Alternatively, the phase shift can be accomplished in a space domain instead of in a time sequence using a multi-channel phase-shift method such as is disclosed by M. Kujawinska, L. Salbut, K. Patorski, 1991 ("Three-Channel Phase Stepped System for Moire Interferometry," *Appl. Opt., Vol.* 30, No. 13, 1633–1635).

Spatial-carrier phase-shifting methods (SCPSM) are single pattern analysis techniques. Examples of SCPSM techniques are discussed in Y. Ichioka, M. Inuiya, 1972 ("Direct Phase Detecting System," *Appl. Opt., Vol.* 11, No. 7, 1507–1514); D. Shough, 0. Kwon, D. Leary, 1990 ("High-Speed Interferometric Measurement of Aerodynamic Phenomena," *Proc. SPIE*, Vol. 1221, 394–403); and M. Pirga, M. Kujawinska, 1995 ("Two Directional Spatial-Carrier Phase-Shifting Method for Analysis of Crossed and Closed Fringe Patterns," *Opt. Eng.*, Vol. 34, No. 8, 2459–2466). An advantage of these single pattern techniques is that they are suitable for dynamic phenomena. However, in SCPSM the carrier phases typically need to be linear and much bigger than the information phase; that is, much bigger than the phase difference between the phase from the object and that of the reference plane. The carrier phase gradient often has to be aligned along one of the sensor array directions with precise tilt to establish the condition that the consecutive pixels have a 90° phase shift. This makes the optical setup difficult and limits the practical application of this approach.

Accordingly, there exists a need for a phase-shift fringe pattern approach to 3-D surface contour measurement that does not require the carrier fringe pattern to be linear or much bigger than the information phase. Moreover, there exists a need for such a system in which the carrier phase need not be accurately aligned relative to the optical sensor array in any prescribed direction.

SUMMARY OF THE INVENTION

In accordance with the present invention, there is provided an image processing method for extracting information from a fringe pattern produced by an optical measurement of an object. The method includes the steps of:

(a) recording an image of the fringe pattern;

(b) determining one or more estimated fringe spacings using fringe lines contained within the image;

(c) generating a plurality of phase-shifted image data sets using the image and the estimated fringe spacing(s);

(d) generating wrapped phase information using the phase-shifted image data sets;

(e) unwrapping the phase information and generating a set of data points representative of the unwrapped phase information;

(f) performing at least one iteration of the following steps (f1) and (f2):

(f1) determining an updated estimated fringe spacing for each of a number of the data points using a curve fitting function; and (f2) repeating steps (c), (d), and (e) using the updated estimated fringe spacings; and (g) generating output data representing information contained in the fringe pattern using the unwrapped phase information determined during the final iteration of step (e).

Starting with an estimated reference spacing [step (b)], the estimated spacing converges to the true fringe spacing as a result of one or more repetitions of the phase window correlation [step (c)], phase calculation [step (d)], unwrapping [step (e)], and curve fitting [step(f1)]. Preferably, the updated estimated spacing is determined for each selected data point by applying a local least squares fit to at least some of the data points in the region about the selected data point. If necessary or desired, noise suppression using pattern reconstruction and smoothing can be iteratively carried out to improve the signal to noise ratio. Where the unwrapped phase information is stored in memory as an array of data points, the local least squares fit can be carried out using a regression window that comprises a number of data points within the same row as the selected data point, with the regression window being centered on the selected data point.

The phase of the projected fringe pattern does not have to be linear, nor does it have to be much bigger than the information phase. Furthermore, the projected carrier phase need not be aligned relative to the optical sensor in any prescribed direction. This flexibility makes the invention suitable for a number of different optical measurement techniques including, for example, projection moiré, speckle, and holographic techniques. Practical applications of the invention include, for example, 3-D surface contour measurement for such purposes as vehicle crash tests, detecting the shape or orientation of a component, or determining the extent of wear on a cutting insert or other machine tool. Moreover, since only a single measured fringe pattern is required, the invention can be used for static, transient, as well as dynamic measurements.

BRIEF DESCRIPTION OF THE DRAWINGS

A preferred exemplary embodiment of the present invention will hereinafter be described in conjunction with the appended drawings, wherein like designations denote like elements, and.

DESCRIPTION OF THE PREFERRED EMBODIMENT

Figure 1:
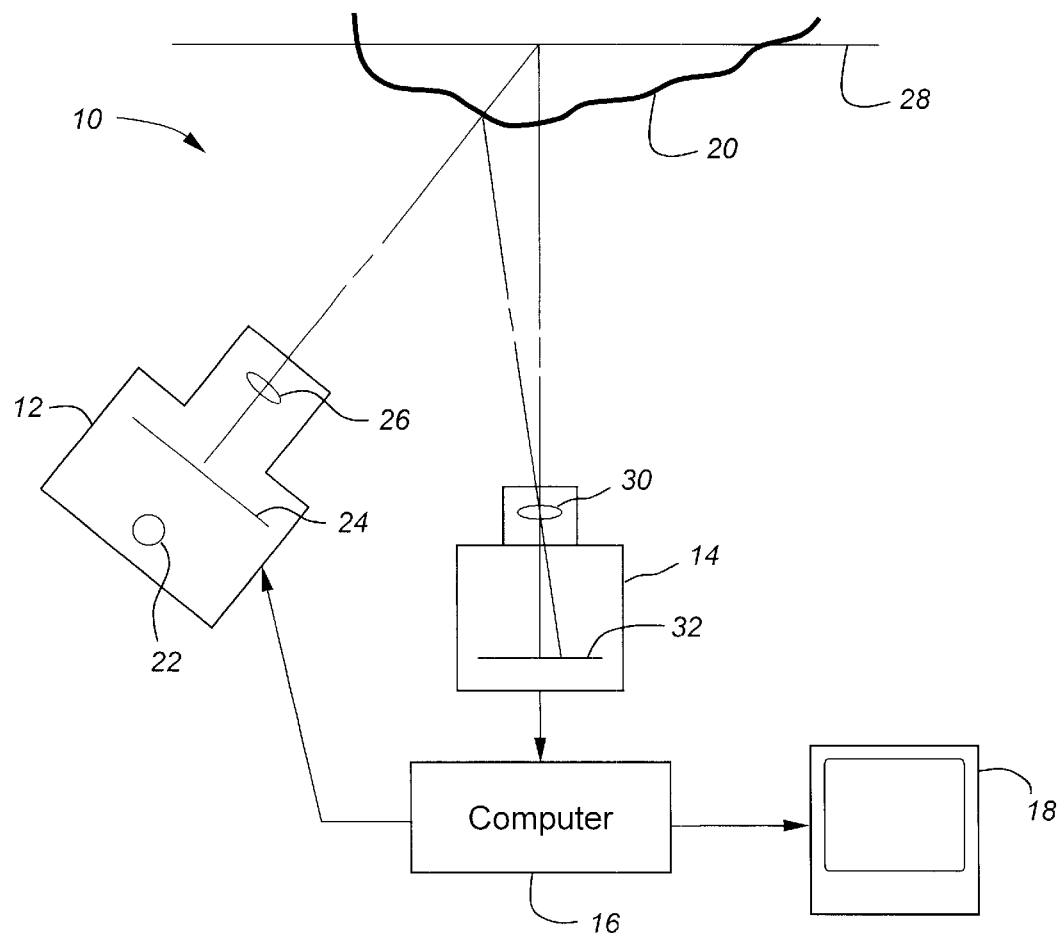
FIG. 1 is a diagrammatic view of a preferred embodiment of a 3-D contour measurement system of the present invention.

Referring first to FIG. 1, there is shown a contour measurement system of the present invention designated generally as 10. Measurement system 10 includes a projection system 12, an imaging system 14, and a computer or other image processing device 16 having a monitor 18 for displaying the surface contour data generated by computer 16. In general, projection system 12 projects a grating onto an object 20 undergoing measurement. The projected grating is a series of isophase surfaces or fringe lines and the intersection of these fringe lines with the object surface generates a phase field that includes the height information of the object when viewed from a perspective angle. Imaging system 14 obtains this phase field by receiving and recording a single image containing the fringe lines that are reflected from the object 20 at a perspective angle. Computer 16 then processes the recorded image according to the method of FIG. 6 to obtain the 3-D surface contour information.

Projection of the fringe lines can be accomplished using a light source 22, grating 24, and a lens 26, all of which comprise a portion of projection system 12. The fringe lines are projected onto an arbitrary reference plane 28 which lies within the imaging system's field of view. Fringe lines reflected from the object 20 are received by the imaging system 14 via an imaging lens 30 and are recorded at an image plane 32 as an array of pixels. This pixel data is sent to computer 16 for processing and determination of the 3-D contour data. If desired, computer 16 can be connected to projection system 12 to control various aspects of the projection of fringe lines onto the object 20, including such things as intensity of the emitted light and spacing of the fringe lines.

As can be seen in FIG. 1, the reference plane 28, imaging plane 32, and the plane of grating 24 are all non-parallel relative to each other. Thus, before describing the preferred approach to processing of the received image and extraction of the height information using computer 16, a description of various geometric considerations and transformations between coordinate systems will be discussed.

In the illustrated embodiment, the x, y, z coordinates of various points on the surface of the object 20 are calculated using the coordinate system of reference plane 28. For this purpose, the fringe lines projected from grating 24 must be described mathematically as a function of their position on the reference plane 28. Furthermore, the fringe lines recorded at the imaging plane 32 must be transformed into the corresponding coordinates on the reference plane. To simplify this latter transformation, the reference plane is taken to be parallel to the imaging plane.

Figure 2:
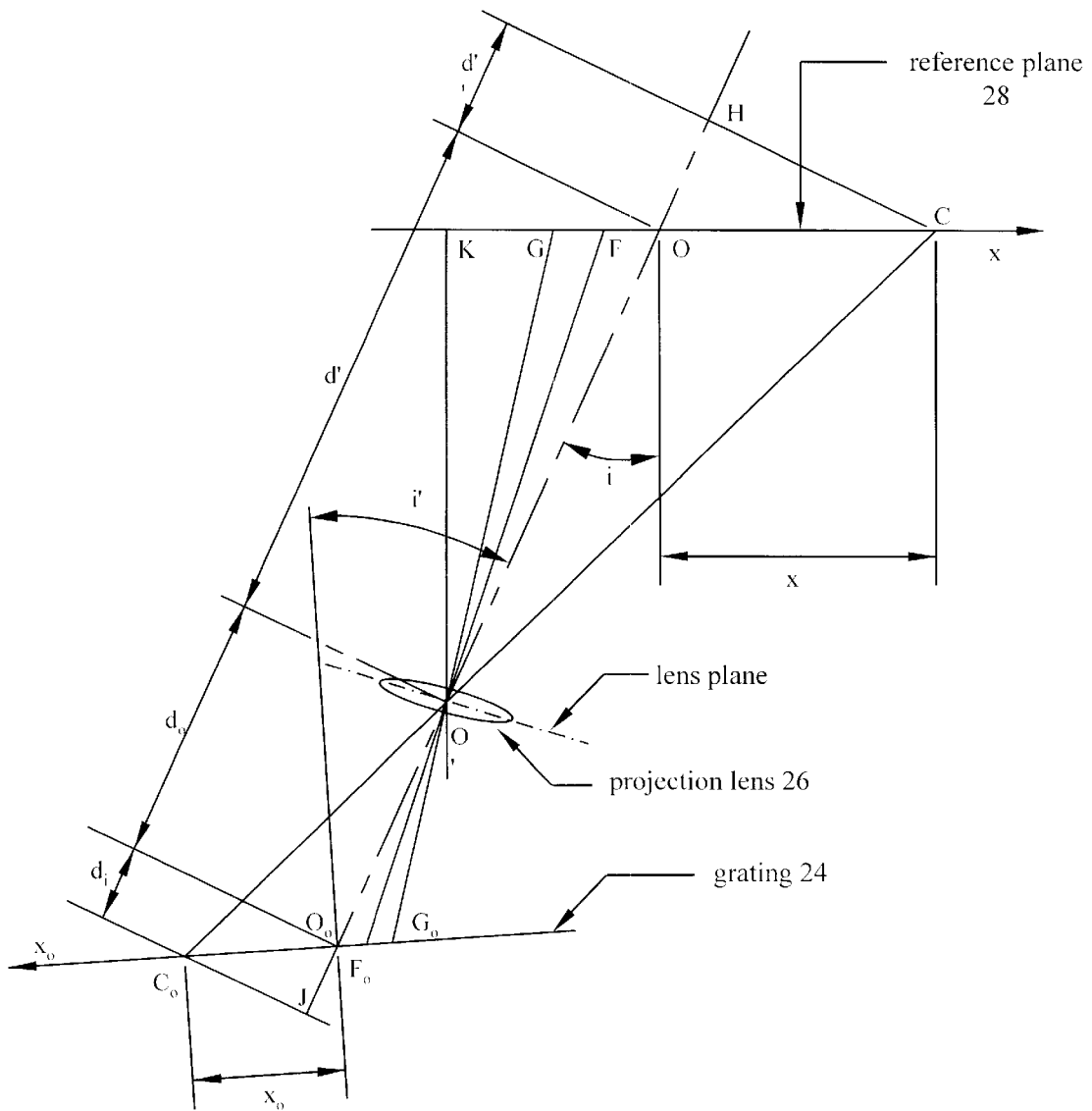
FIG. 2 is a diagram showing the grating and projection lens used in the measurement system of FIG. 1 and depicting a generalized case of the x-y positioning and orientation of these components relative to a reference plane for purposes of calculation of the phase on a reference plane.

Referring now to FIG. 2, the derivation of an equation describing the projected grating in the reference plane coordinate system will now be described. Grating 24 is located on the $x_0$ plane and is illuminated from the rear by light source 22. The resulting fringe lines are projected by lens 26 onto the reference plane 28, which is denoted x. In this figure, $O_0$ is the center of the original grating 24, O is the center of the object being tested. Light ray $\overline{O_0O}$ does not usually coincide with the lens axis, as indicated in FIG. 2. However, the image on point O can be simply and accurately focused by adjusting the optical set up.

The grating 24 on the $x_0$ plane has its fringe lines normal to the plane of the figure with a constant period $p_0$. The transmittance of the grating does not have to be sinusoidal, but for simplicity, it can be assumed to be:

$$I_0(x_0) = A_0 + B_0 \cos\left(\frac{2\pi x_0}{p_0} + c_0\right), \tag{1}$$

where $A_0$, $B_0$, and $c_0$ are constants. The term inside the cosine function, $$\phi = \frac{2\pi x_0}{p_0} + c_0 \tag{2}$$

is referred to as the phase. The lens 26 projects a phase field to the space behind the lens. The phase on the x plane is the intersection of the phase field with the reference plane 28. On each light path, the phase is the same. For instance the phase all along line $\overline{C_0C}$ is constant, and so are the phases on lines $\overline{F_0F}$ and $\overline{G_0G}$. In other words, $\overline{C_0C}$, $\overline{F_0F}$, and $\overline{G_0G}$ are isophase surfaces.

Because the grating is equally spaced, the phase on the $x_0$ plane is linear. However, since the grating is projected onto the x plane with an inclination angle i, the phase on x plane is generally not linear. Also, the $x_0$ plane is not necessarily perpendicular to the lens axis, nor is it necessarily parallel to the x plane. Therefore, the angle i' does not necessarily equal i. This situation contributes to the non-linearity of the phase on the x plane too. Since the phase on $\overline{C_0C}$ is constant, the phase of point C is $\phi_r = 2\pi x_0/p_0 + c_0$, with the subscript r denoting that it is the phase at the reference plane. The projection on the x plane is then:

$$I(x) = A + B \cos\left(\frac{2\pi x_0}{p_0} + c_0\right), \tag{3}$$

where A and B are constants. By using the relationship between $x_0$ and x, equation (3) can be expressed in term of x. This relationship can be derived as follows. Since triangle $C_0JO'$ is similar to triangle $CHO'$, then:

$$\frac{\overline{CH}}{\overline{C_0J}} = \frac{d' + d''}{d_0 + d_1}. \tag{4}$$

Also, $$\overline{CH} = x \cos i$$

$$d'' = x \sin i \tag{5}$$

and $$\overline{C_0J} = x_0 \cos i'$$

$$d_1 = x_0 \sin i' \tag{6}$$

Substituting equations (5) and (6) into equation (4) yields:

$$\frac{x \cos i}{x_0 \cos i'} = \frac{d' + x \sin i}{d_0 + x_0 \sin i'}. \tag{7}$$

This equation can then be solved for $x_0$:

$$x_0 = \frac{x d_0 \cos i}{d' \cos i' + x \sin(i - i')}. \tag{8}$$

By substituting equation (8) into equation (3), the projection of the fringe lines onto the reference plane can be represented in terms of the reference plane coordinate system as follows:

$$I(x) = A + B \cos\left\{\frac{2\pi x d_0 \cos i}{p_0[d' \cos i' + x \sin(i - i')]} + c_0\right\} = A + B \cos\phi. \tag{9}$$

As will be appreciated, the various orientations shown in FIG. 2 depict the most general case of the optical setup. Angles i and i' are allowed to be a little different so the alignment will not be very critical. The non-linearity of the fringe lines is compensated for in the demodulation. The lens's optical axis is located between $\overline{O'K}$ and $\overline{O''O}$ and, as shown, is roughly at $\overline{O'G}$. This is a compromise of the image quality and defocusing effect.

Since $d_0$, d', i, i', $p_0$, and $c_0$ are constants, the carrier or reference phase on the reference plane 28 can be written as:

$$\phi_r = \frac{2\pi x d_0 \cos i}{p_0(d' + x \sin i)} + c_0 = \frac{bx + d}{fx + 1}, \tag{10}$$

where b, d, and f are constants. Thus, it is not necessary to know all the parameters like $d_0$, d', i, i', $p_0$, and $c_0$. The measurement of these parameters can be tedious and very difficult, and the errors of the measurements can stack up to an intolerable value. Accordingly, as will be discussed farther below, the set up constants can be found using calibration and a least squares fit to solve the problem and provide more accurate results.

The reference phase given in equation (10) is the phase in the reference plane coordinate system of a pure carrier obtained from the projection of the grating 24. The information phase is the phase difference between the phase reflected from the object 20 and the phase on the reference plane 28. Thus, it will be appreciated that the carrier phase is used for purposes of modulating the information phase. As will be discussed farther below, the information phase can be determined using the process of FIG. 6. Thereafter, the height information z for each point can be obtained from this information phase using equations that will now be derived in connection with FIG. 3.

Figure 3:
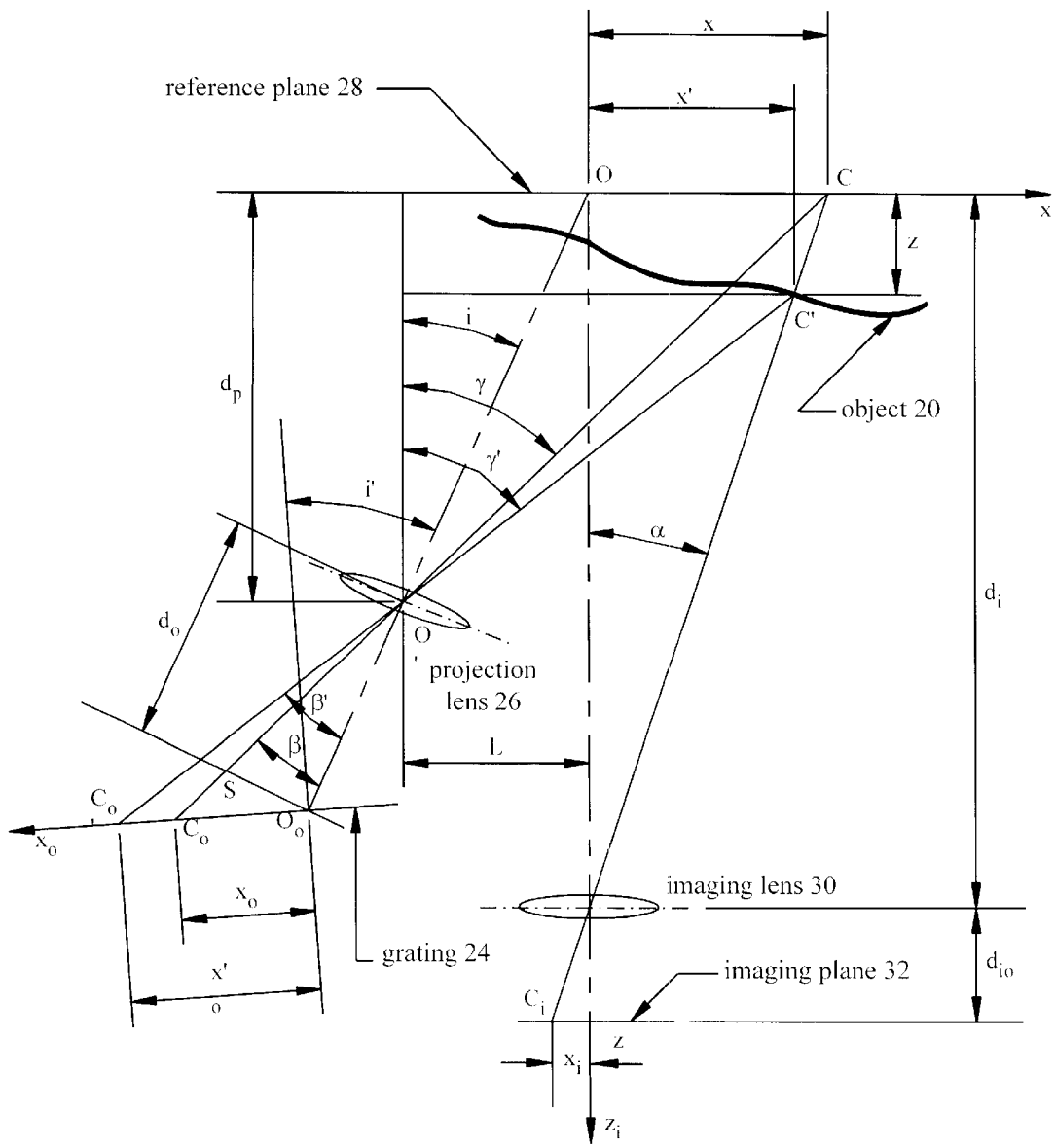
FIG. 3 is a diagram as in FIG. 2 showing the projection of the grating onto an object and the sensing of the reflected image for purposes of calculation of the phase on the imaging plane.

As shown in FIG. 3, the imaging system 14 sees point C' on the object 20, while the corresponding point on reference plane 28 is actually C. The information phase is the phase difference between points C' and C and, more accurately, is the phase difference between isophase surfaces $\overline{C_0'C'C_i}$ and $\overline{C_0CC_i}$.

From FIG. 3, it will be appreciated that:

$$x = d_i \tan \alpha, \tag{11}$$

where $d_i$ is the distance between the imaging lens center and the reference plane. Similarly, $$x' = (d_i - z)\tan\alpha = x - z\tan\alpha. \quad (12)$$

Also $$\sin\gamma = \frac{x + L}{\sqrt{(x+L)^2 + d_p^2}} \quad (13)$$

$$\cos\gamma = \frac{d_p}{\sqrt{(x+L)^2 + d_p^2}},$$

where L is the x horizontal distance between the projection lens center and the imaging lens center, and $d_p$ is the distance between the projection lens center and the reference plane. Similarly, $$\sin\gamma' = \frac{x' + L}{\sqrt{(x+L)^2 + (d_p - z)^2}} \quad (14)$$

$$\cos\gamma' = \frac{d_p - z}{\sqrt{(x+L)^2 + (d_p - z)^2}}.$$

By inspection of FIG. 3, it will be appreciated that, for triangle $\overline{O_0O'S}$:

$$\overline{O_0S} = d_0 \tan\beta. \quad (15)$$

Also, for triangle $C_0O_0S$, angle $\angle SC_0O_0 = 90° - \beta - i'$, and $\angle O_0SC_0 = 90° + \beta$, and, therefore:

$$\frac{x_0}{\overline{O_0S}} = \frac{\sin\angle O_0SC_0}{\sin\angle SC_0O_0} = \frac{\sin(90° + \beta)}{\sin(90° - \beta - i')}. \quad (16)$$

Substituting equations (13) and (15) into equation (16) yields:

$$x_0 = \overline{O_0S}\frac{\cos\beta}{\cos(\beta + i')} = d_0\frac{\sin\beta}{\cos(\beta + i')} \quad (17)$$

$$= d_0\frac{\sin(\gamma - i)}{\cos(\gamma - i + i')} = d_0\frac{\sin\gamma\cos i - \cos\gamma\sin i}{\cos\gamma\cos\delta i + \sin\gamma\sin\delta i}$$

$$= d_0\frac{(x + L)\cos i - d_p\sin i}{d_p\cos\delta i + (x + L)\sin\delta i} = d_0\frac{x\cos i}{d_p\cos\delta i + (x + L)\sin\delta i}$$

where $\delta i = i - i'$. Similarly, using equation (14) yields:

$$x'_0 = d_0\frac{\sin(\gamma' - i)}{\cos(\gamma' - i + i')} = d_0\frac{x'\cos i + z\sin i}{(d_p - z)\cos\delta i + (x' + L)\sin\delta i}. \quad (18)$$

Next, equation (12) can be inserted into equation (18) so that:

$$x'_0 = d_0\frac{(x - z\tan\alpha)\cos i + z\sin i}{(d_p - z)\cos\delta i + (x - z\tan\alpha + L)\sin\delta i}. \quad (19)$$

The information phase (i.e., the height information) for point C' can be represented by the equation:

$$\phi_h = \phi_{C'} - \phi_C = \frac{2\pi}{p_0}(x'_0 - x_0). \quad (20)$$

By substituting equations (17) and (19) into equation (20), the information phase can be represented accurately for the general case by the equation:

$$\phi_h = \frac{2\pi d_0}{p_0}\left[\frac{(x - z\tan\alpha)\cos i + z\sin i}{(d_p - z)\cos\delta i + (x - z\tan\alpha + L)\sin\delta i} - \frac{x\cos i}{d_p\cos\delta i + (x + L)\sin\delta i}\right]. \quad (21)$$

In actual use, $d_0$ and $p_0$ need not be actually measured, but can be accounted for using a calibration factor k. Denote $k = 2\pi d_0/p_0$. Then, recognizing that $L = d_p \tan i$ and using $\tan\alpha = x/d_i$, equation (21) becomes:

$$\phi_h = k\left[\frac{\left(1 - \frac{z}{d_i}\right)x\cos i + z\sin i}{(d_p - z)\cos\delta i + \left(x - z\frac{x}{d_i} + d_p\tan i\right)\sin\delta i} - \frac{x\cos i}{d_p\cos\delta i + (x + d_p\tan i)\sin\delta i}\right] \quad (22)$$

where k can be found in calibration using a known $\phi_h$. This equation can then be solved for z.

As can be seen from equation (22), the information is generally a function of x and z. In the special case where i and i' are equal, non-zero angles, $\delta i = 0$. In this case, equation (22) can be simplified as:

$$\phi_h = k\left[\frac{\left(x - z\frac{x}{d_i}\right)\cos i + z\sin i}{d_p - z} - \frac{x\cos i}{d_p}\right]. \quad (23)$$

Usually, $d_p \gg z$ and $x \ll d_i$. Thus, equation (23) can be further simplified:

$$\phi_{h\_sim} = \frac{k\sin i}{d_p}z, \quad (24)$$

where the subscript _sim stands for simplified. This equation can be rewritten to provide a final mathematical solution for the height z of the object surface at any one point relative to the reference plane:

$$z = \frac{d_p}{k\sin i}\phi_{h\_sim}. \quad (25)$$

Thus, equation (22) provides the general case which can be solved for z and used, if desired, whereas equation (25) provides a more practical implementation using the common assumption (which can be nearly achieved by proper adjustments of the optical setup) that the projected grating is linear on the reference plane.

Next, a process for determination of the calibration factor k will now be discussed. This is done using a sample with known depth $Z_{cal}$. The sample is placed near the reference plane, preferably at the center of the imaging system's optical axis. A measurement is then taken and the process of FIG. 6 used to find the corresponding phase, which is denoted as $\phi_{cal}$. Define the calibration factor k as:

$$k = \frac{z_{cal}}{\phi_{cal}}. \quad (26)$$

Figure 6:
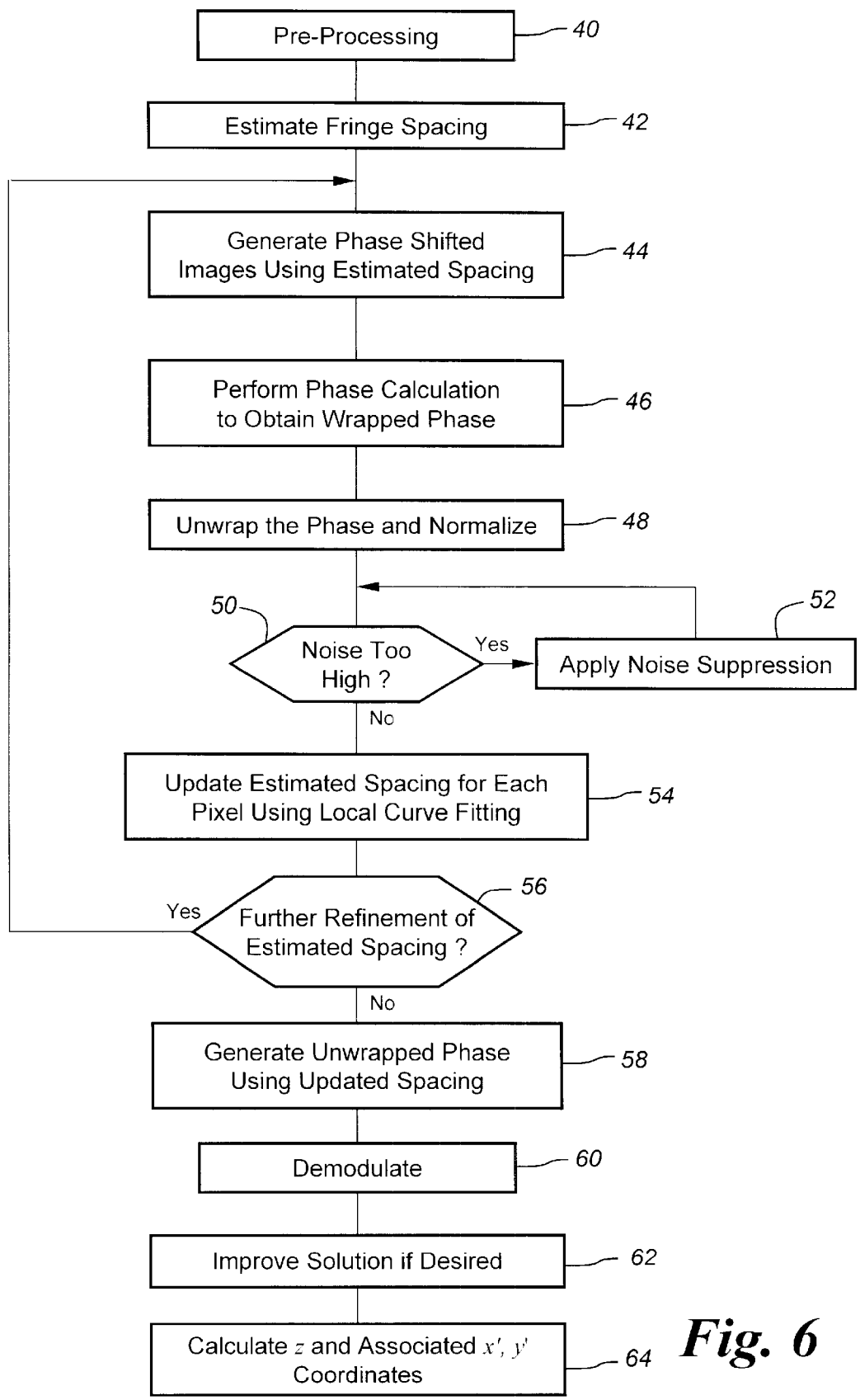
FIG. 6 is a flow chart depicting a preferred embodiment of an image processing method of the present invention as it could be utilized in the 3-D contour measurement system of FIG. 1.

Next, the information phase of an object found from the process of FIG. 6 can be generally denoted as $\phi_{pro}$. If the non-linearity is omitted in equation (22), the height after calibration can be calculated as:

$$z_{pro} = k\phi_{pro} = \frac{z_{cal}}{\phi_{cal}}\phi_{pro}. \quad (27)$$

The measurement can be calibrated at the center of the sample object, where x=0, so the error is zero there. After calibration, the error can be defined as:

$$err_{cal} = \frac{z_{pro} - z}{z}, \quad (28)$$

where z is the true height. If the error is not sufficiently small, a more sophisticated calibration could be done over the object surface by calibrating k as a function of x.

As mentioned previously, in the illustrated embodiment the height and other coordinates of an object undergoing measurement are determined in the reference plane's coordinate system. Thus, the phase of the recorded image (i.e., the phase on the imaging plane) must be transformed to the reference plane. Since reference plane is parallel to the imaging plane, the same types of transformations discussed above in connection with the projection of the grating onto the reference plane are not applicable. Rather, the transformations involve primarily two factors, relative rotation of the coordinate axes and magnification. The latter of these, magnification, can be appreciated from FIG. 3 by a comparison of x versus $x_i$. As will be appreciated, although this magnification M can be determined by the equation M=$d_{i0}$/$d_i$, it is accounted for by the calibration factor k, and therefore need not be included in the equations.

Figure 4:
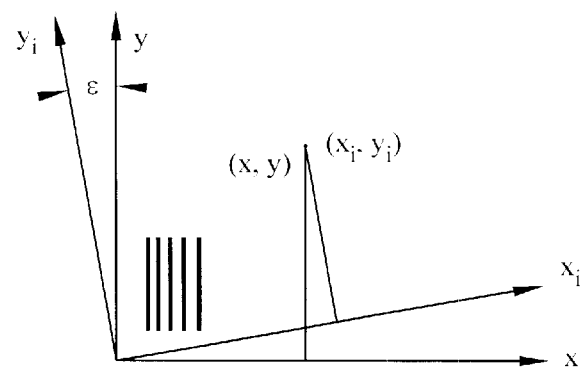
FIG. 4 depicts the effect of the difference in orientation between the z axes of the imaging system and grating of FIG. 1.

The potential relative rotation between the x-y coordinate axes of the reference plane and imaging plane can be understood by reference to FIGS. 3 and 4. In FIG. 3 the $y_0$ axis of the grating plane and the y axis of the reference plane are both perpendicular to the planes in which the figures lie. Ideally, the $y_i$ axis of the imaging plane would also be perpendicular to the plane of these figures too. However, there could be some misalignment, with the imaging system being rotated around its $z_i$ axis by an angle $\epsilon$. This is illustrated in FIG. 4.

The transformation between the two coordinate systems is:

$$x = x_i \cos\epsilon - y_i \sin\epsilon$$

$$y = x_i \sin\epsilon + y_i \cos\epsilon. \quad (29)$$

By substituting equation (29) into equation (10) and denoting the phase of the reference grating on the imaging plane as $\phi_{ri}$, the equations yield:

$$\phi_{ri} = \frac{b(x_i\cos\epsilon - y_i\sin\epsilon) + d}{f(x_i\cos\epsilon - y_i\sin\epsilon) + 1}. \quad (30)$$

However, $\epsilon$ is usually an unknown value. To find $\epsilon$, equation (30) is first rewritten as:

$$\phi_{ri} = \frac{bx_i + cy_i + d}{ex_i + fy_i + 1}, \quad (31)$$

where b, c, d, e, and f are constants. To include possible grating twist during the imaging process, an xy term can be included in the numerator, so the reference phase is:

$$\phi_{ri} = \frac{ax_iy_i + bx_i + cy_i + d}{ex_i + fy_i + 1}, \quad (32)$$

where a, b, c, d, e, and f are constants and can be found by a global least square fit, as will be described farther below.

Equation (32) is a general formula for the reference phase which is generally non-linear. The rotation angle $\epsilon$ can be determined by comparing the coefficients of $x_i$ and $y_i$ from equations (30) and (31). This yields the equation:

$$\varepsilon = \arctan\left(-\frac{c}{b}\right). \quad (33)$$

Once determined, this rotation angle can be used in equation (29) to convert the result back to the xy system. The reverse transformation is:

$$x_i = x \cos\epsilon + y \sin\epsilon$$

$$y_i = -x \sin\epsilon + y \cos\epsilon. \quad (34)$$

These two equations can be substituted back into equation (32) to thereby determine the carrier phase $\phi_r$ on the reference plane:

$$\phi_r = \frac{a(x\cos\varepsilon + y\sin\varepsilon)(-x\sin\varepsilon + y\cos\varepsilon) + b(x\cos\varepsilon + y\sin\varepsilon) +}{e(x\cos\varepsilon + y\sin\varepsilon) + f(-x\sin\varepsilon + y\cos\varepsilon) + 1}. \quad (35)$$

This equation can be simplified to yield:

$$\phi_r = \frac{axy\cos 2\varepsilon + \frac{a}{2}(y^2 - x^2)\sin 2\varepsilon + bx\cos\varepsilon + by\sin\varepsilon - cx\sin\varepsilon + cy\cos\varepsilon + d}{ex\cos\varepsilon + ey\sin\varepsilon - fx\sin\varepsilon + fy\cos\varepsilon + 1}. \quad (36)$$

In the image processing, $\phi_r$ is found on all the pixels in the pure carrier area by the phase extraction technique. To find constants a, b, c, d, e, and f, equation (32) can be rearranged as follows:

$$ex_i\phi_{ri} + fy_i\phi_{ri} + \phi_{ri} - ax_iy_i - bx_i - cy_i - d = 0. \quad (37)$$

Next, an error factor is defined:

$$E = \sum_{sum\,on\,j}(ex_{i\_j}\phi_{ri\_j} + fy_{i\_j}\phi_{ri\_j} + \phi_{ri\_j} - ax_{i\_j}y_{i\_j} - bx_{i\_j} - cy_{i\_j} - d)^2, \quad (38)$$

where $(x_{i\_j}, y_{i\_j})$ are the coordinates of pixel j, and $\phi_{ri\_j}$ is the reference phase of pixel j. The summation covers all the pure carrier area pixel by pixel. Taking partial derivatives on equation (38) yields:

$$\frac{\partial E}{\partial a} = 0, \quad \frac{\partial E}{\partial b} = 0, \quad \frac{\partial E}{\partial c} = 0, \quad (39)$$

$$\frac{\partial E}{\partial d} = 0, \quad \frac{\partial E}{\partial e} = 0, \quad \frac{\partial E}{\partial f} = 0.$$

Substituting equation (38) into equation (39) yields:

$$e\Sigma x^2_{i\_j}y_{i\_j}\phi_{ri\_j} + f\Sigma x_{i\_j}y^2_{i\_j}\phi_{ri\_j} + \Sigma x_{i\_j}y_{i\_j}\phi_{ri\_j} -$$

$$a\Sigma x^2_{i\_j}y^2_{i\_j} - b\Sigma x^2_{i\_j}y_{i\_j} - c\Sigma x_{i\_j}y^2_{i\_j} - d\Sigma x_{i\_j}y_{i\_j} = 0 \quad (40)$$

$$e\Sigma x^2_{i\_j}\phi_{ri\_j} + f\Sigma x_{i\_j}y_{i\_j}\phi_{ri\_j} + \Sigma x_{i\_j}\phi_{ri\_j} -$$

$$a\Sigma x^2_{i\_hd}y_{i\_j} - b\Sigma x^2_{i\_j} - c\Sigma x_{i\_j}y_{i\_j} - d\Sigma x_{i\_j} = 0 \quad (41)$$

$$e\Sigma x_{i\_j}y_{i\_j}\phi_{ri\_j} + f\Sigma y^2_{i\_j}\phi_{ri\_j} + \Sigma y_{i\_j}\phi_{ri\_j} -$$

$$a\Sigma x_{i\_j}y^2_{i\_j} - b\Sigma x_{i\_hd}y_{i\_j} - c\Sigma y^2_{i\_j} - d\Sigma y_{i\_j} = 0 \quad (42)$$

$$e\Sigma x_{i\_j} + f\Sigma y_{i\_j}\phi_{ri\_j} + \Sigma\phi_{ri\_j} -$$

$$a\Sigma x_{i\_j} - b\Sigma x_{i\_j} - c\Sigma y_{i\_j} - nd = 0 \quad (43)$$

$$e\Sigma x^2_{i\_j}\phi^2_{ri\_j} + f\Sigma x_{i\_j}y_{i\_j}\phi^2_{ri\_j} + \Sigma x_{i\_j}\phi^2_{ri\_j} -$$

$$a\Sigma x^2_{i\_j}y_{i\_j}\phi_{ri\_j} - b\Sigma x^2_{i\_j}\phi_{ri\_j} - c\Sigma x_{i\_j}y_{i\_j}\phi_{ri\_j} -$$

$$d\Sigma x_{i\_j}\phi_{ri\_j} = 0 \quad (44)$$

$$e\Sigma x_{i\_j}y_{i\_j}\phi^2_{ri\_j} + f\Sigma y^2_{i\_j}\phi^2_{ri\_j} + \Sigma y_{i\_j}\phi^2_{ri\_j} -$$

$$a\Sigma x^2_{i\_j}\phi_{ri\_j} - b\Sigma x_{i\_j}y_{i\_j}\phi_{ri\_j} - c\Sigma y^2_{i\_j}\phi_{ri\_j} -$$

$$d\Sigma y_{i\_j}\phi_{ri\_j} = 0, \quad (45)$$

where n is the total number of pixel data points in the pure carrier area.

Rewriting equations (40)–(45):

$$a\Sigma x^2_{i\_j}y^2_{i\_j} + b\Sigma x^2_{i\_j}y_{i\_j} + c\Sigma x_{i\_j}y^2_{i\_j} + d\Sigma x_{i\_j}y_{i\_j} -$$

$$e\Sigma x^2_{i\_ji}\phi_{ri\_j} - f\Sigma x_{i\_j}y^2_{i\_j}\phi_{ei\_j} = \Sigma x_{i\_j}y_{i\_j}\phi_{ri\_j} \quad (46)$$

$$a\Sigma x^2_{i\_j}y_{i\_j} + b\Sigma x^2_{i\_j} + c\Sigma x_{i\_j}y_{i\_j} + d\Sigma x_{i\_j} -$$

$$e\Sigma x^2_{i\_j}\phi_{ri\_j} - f\Sigma x_{i\_j}y_{i\_j}\phi_{ri\_j} = \Sigma x_{i\_j}\phi_{ri\_j} \quad (47)$$

$$a\Sigma x_{i\_j}y^2_{i\_j} + b\Sigma x_{i\_j}y_{i\_j} + c\Sigma y^2_{i\_j} + d\Sigma y_{i\_j} -$$

$$e\Sigma x_{i\_j}y_{i\_j}\phi_{ri\_j} - f\Sigma y^2_{i\_j}\phi_{ri\_j} = \Sigma y_{i\_j}\phi_{ri\_j} \quad (48)$$

$$a\Sigma x_{i\_j}y_{i\_j} + b\Sigma x_{i\_j} + c\Sigma y_{i\_j} + nd -$$

$$e\Sigma x_{i\_j}\phi_{ri\_j} - f\Sigma y_{i\_j}\phi_{ri\_j} = \Sigma\phi_{ri\_j} \quad (49)$$

$$a\Sigma x^2_{i\_j}y_{i\_j}\phi_{ri\_j} + b\Sigma x^2_{i\_j}\phi_{ri\_j} + c\Sigma x_{i\_j}y_{i\_j}\phi_{ri\_j} + d\Sigma x_{i\_j}\phi_{ri\_j} -$$

$$e\Sigma x^2_{i\_j}\phi^2_{ri\_j} - f\Sigma x_{i\_j}y_{i\_j}\phi^2_{ri\_j} = \Sigma x_{i\_j}\phi^2_{ri\_j} \quad (50)$$

$$a\Sigma x_{i\_j}y^2_{i\_j}\phi_{ri\_j} + b\Sigma x_{i\_j}y_{i\_j}\phi_{ri\_j} + c\Sigma y^2_{i\_j}\phi_{ri\_j} + d\Sigma y_{i\_j}\phi_{ri\_j} -$$

$$e\Sigma x_{i\_j}y_{i\_j}\phi^2_{ri\_j} - f\Sigma y^2_{i\_j}\phi^2_{ri\_j} = \Sigma y_{i\_j}\phi^2_{ri\_j} \quad (51)$$

Equations (46)–(51) can be solved to obtain the constants a, b, c, d, e, and f.

Once the reference phase $\phi_r$ is determined using equation (36), it can be used in the method of FIG. 6 to determine the information phase $\phi_r$, and thus the height z for each (x,y) data point.

In the illustrated embodiment, once the height z is determined for each (x,y) data point, a final adjustment is made that uses the height z at each point to determine the actual associated (x,y) coordinates. More particularly, as can be seen by inspection of FIG. 3, C" is the intersection of line $\overline{C_iC}$ and the object surface. The x dimension of C' is x' not x. That means the z calculated from equation (22) is actually the height at point x'. No matter what x' is, the imaging system associates the calculated z with x because x is the dimension on the reference plane that corresponds to $X_i$ seen by the imaging system. Similarly, z is associated with a y coordinate y', not y. In order to relate z to x' and y', a post processing can be done using the calculated height z.

Figure 5:
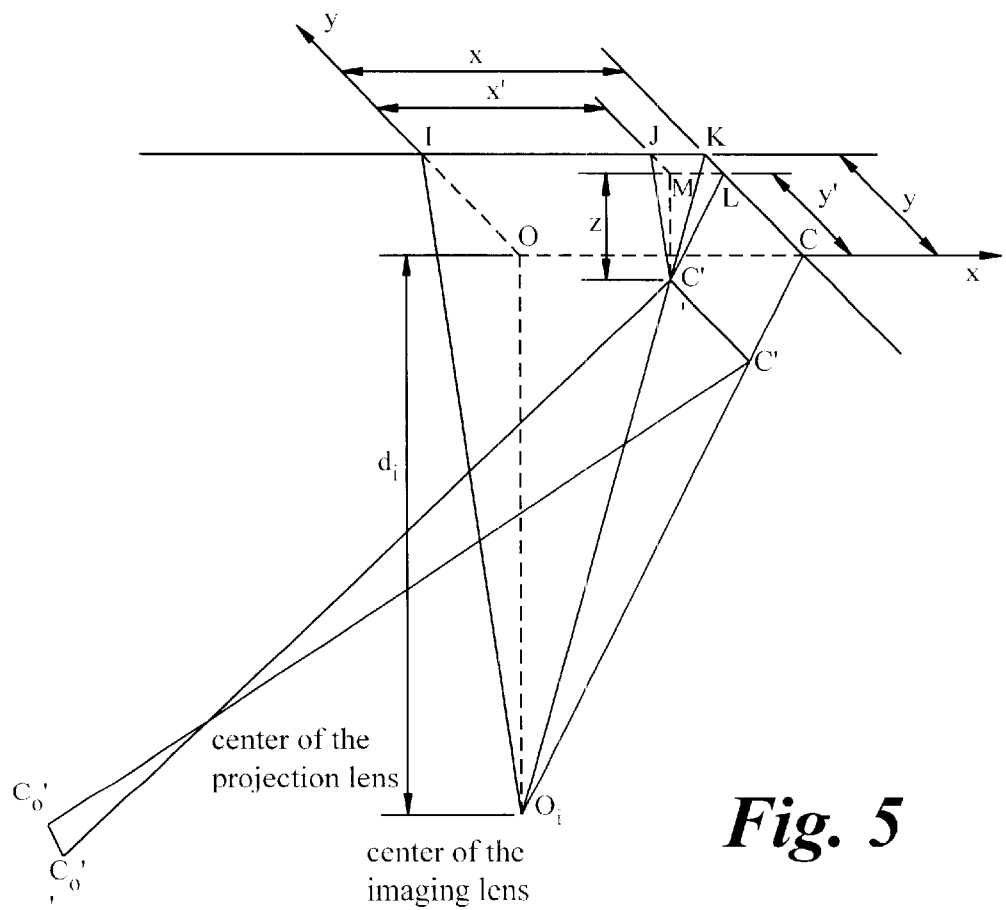
FIG. 5 is a diagram depicting the coordinate system adjustment used by the measurement system of FIG. 1 to map the x, y coordinates seen by the imaging system onto the reference plane.

This post processing can be accomplished mathematically. Consider FIG. 5. $\overline{C_0"C"C"C_0'}$ is the isophase surface that intersects the object surface on point C". Lines $\overline{C_0'C_0"}$ and $\overline{C'C"}$ are parallel to the original grating lines, so they only show corresponding points in FIG. 5. Since the phases of C" and C' are the same, equations (11)–(25) for point C' are good for C". In other words, the y dimension does not play a role in the phase derivation.

However, as stated above, the height calculated from equation (22) does not belong to (x,y), it belongs to (x',y'). By inspection of FIG. 5, it can be seen that pyramid $\overline{O_iOCKI}$ is similar to pyramid $\overline{C"MLKJ}$. Thus:

$$\frac{x-x'}{x'} = \frac{y-y'}{y'} = \frac{z}{d_i}, \quad (52)$$

which can be written in the form of:

$$x = \left(1 + \frac{z}{d_i}\right)x' \quad (53)$$

$$y = \left(1 + \frac{z}{d_i}\right)y'$$

and then solved for x',y':

$$x' = \frac{x}{\left(1 + \frac{z}{d_i}\right)}, \quad (54)$$

$$y' = \frac{y}{\left(1 + \frac{z}{d_i}\right)}.$$

Before considering the procedure disclosed in FIG. 6 for obtaining and processing the fringe pattern reflected from the object 20, reference is momentarily made back to FIG. 1 for consideration of various aspects of the imaging system 14. As will be appreciated by those skilled in the art, imaging system 14 can comprise a digital camera or other optical sensor that includes a CCD or other light sensing element having an array of pixels in the form of successive scan lines or rows of pixels, with the camera providing an output signal (data point) for each pixel that is indicative of the intensity of light impinging upon the corresponding pixel element within the array. Alternatively, the fringe pattern image can be recorded on film or by some other non-digital means and then digitized or otherwise converted to a digital image that is stored as a plurality of pixel data points. In this regard, it will be understood that the individual data points need not be physically stored as an array or in an array data structure, as long as each pixel data point is somehow associated with its imaging plane $x_i,y_i$ coordinate so that it is logically stored as an array.

Preferably, where a camera having an array of pixels is used, the rows of pixels are oriented such that they run generally perpendicular to direction of fringe lines produced by grating 24. These pixel data points can then be stored logically as an array such that each row of the stored array cuts across most if not all of the fringe lines received by the camera. Acquisition of the pixel data from camera can be achieved in any of a number of ways known to those skilled in the art. For example, the pixel data can be supplied by the camera as digital data or as analog data that is digitized by computer 16 using an image capture board or other suitable analog to digital converter.

Computer 16 can be a microprocessor based general-purpose computer programmed to carry out the method of FIG. 6 and, in this regard, can include a keyboard and mouse or other serial input device, and can be connected to a printer to provide hardcopy output. Furthermore, when used as part of an automated inspection machine or production equipment, computer 16 can be connected to various other controllers and/or actuators to, for example, specify acceptance or rejection of a manufactured article or to initiate or indicate the location on a workpiece at which an automated operation is to be performed.

Turning now to FIG. 6, the process utilized by the measurement system of FIG. 1 to extract the 3-D information from the received image will now be described. Prior to use of this method, the system is preferably calibrated as described in connection with equation (26) to determine the calibration factor k that is used to calculate the height z from equation (25). Also, using equations (46)–(51), the constants a, b, c, d, e, and f used in equation (36) to represent the carrier phase $\phi_r$ on the reference plane can be determined initially before the object is measured, or can be determined from the fringe pattern image of the object using portions of the fringe lines that do not contain any information regarding the object. The carrier phase determination need only be made sometime prior to the demodulation described below in connection with FIG. 6.

Figure 8:
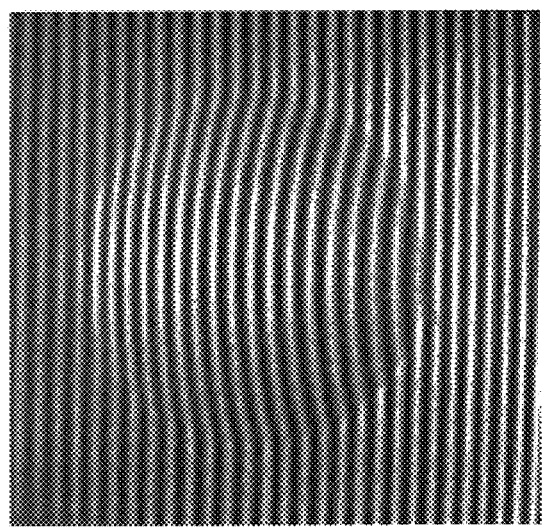
FIG. 8 is an exemplary screen shot of a displayed image of projected fringe lines reflected at an angle from a specimen block having a concave recess.

For purposes of illustration, the process of FIG. 6 will be described as it could be used to provide a 3-D surface contour mapping of a specimen block having a simple concave recess. A sample recorded image is shown in FIG. 8. As can be seen in this image, there are portions of the fringe lines above and below the center area of the image that do not contain information about the surface features of interest (i.e., about the concavity in the sample block). Thus, a global least squares fit using equations (46)–(51) can be taken on these portions to find the reference phase $\phi_r$ using equation (36).

In general, the method involves estimating the fringe spacing w at each point, iteratively refining this estimation through phase-shift analysis using a localized curve fitting function that is applied to the resulting modulated phase at the end of each iteration, and then demodulating the refined modulated phase following the last iteration to thereby generate the information phase used to determine the height z at each point. More particularly, once the image is recorded and stored by the computer, the method of FIG. 6 begins at block 40 where the recorded fringe pattern is pre-processed to place it in better form for the subsequent artificial generation of phase-shifted patterns by a correlation calculation which will be described below.

The light intensity of the carrier modulated fringe pattern recorded by the imaging system can be represented as:

$$I_m(x,y) = A(x,y) + B(x,y)\cos[\phi(x,y) + \phi_r(x,y)], \quad (55)$$

where $A(x,y)$ is the low frequency part, $B(x,y)$ is the amplitude, $\phi_r(x,y)$ is the carrier phase, and $\phi(x,y)$ is the information phase in which we are interested. Subscript m stands for "modulated." The pre-processing carried out at block 40 is optional and can include various known techniques for improving the data. The next step at block 42 is to estimate the fringe spacing w. Initially, this can be accomplished by measurement of the spacing shown in the recorded image to get a single estimation $\overline{w}$ that is independent of coordinate (or pixel) position; thereafter, the estimation is done on a pixel-by-pixel basis using a local least squares fit or other suitable regression.

Where the fringe lines run generally vertically (i.e., in the y-direction), w will be a function of x. Thus, the estimated spacing $\overline{w}$ can initially be determined at block 42 by constructing an imaginary line along the xi axis that crosses several fringes. The line should start and terminate at locations having approximately the same phase (e.g., at the valleys of the light intensity distribution). This can be done manually using a computer mouse or other serial input device or can be automated in software by suitable image processing techniques. The computer is then operable to calculate the initial estimated spacing $\overline{w}$ by dividing the length of the imaginary line (e.g., the number of pixels or $x_i$-axis coordinate distance) by the number of fringes the line crosses. This estimation need not be particularly accurate—a number between half and double the true fringe spacing is suitable. For objects having sharp steps in height, a single global estimate for the spacing may not be suitable. In this case, the image can be divided into different regions and a different estimated spacing can be determined and used initially for each region.

Next, at block 44, four fringe patterns with respective quadrature phase shifts of 0°, 90°, 180°, and 270° are created by a correlation integration:

$$I_{mi}(x) = I_m(x) \otimes h_i(x), \quad i = 1, 2, 3, 4, \quad (56)$$

where $\otimes$ denotes a correlation calculation and $h_i(x)$ is a phase window that includes a trigonometric function $f(w,x,i)$ having the form:

$$f\left[\frac{2\pi x}{w} - (i-1)\frac{\pi}{2}\right]. \quad (57)$$

Preferably, $h_i(x)$ includes a rectangular function and is defined by the equation:

$$h_i(x) = rect\left(\frac{x}{w}\right)\cos\left[\frac{2\pi w}{w} - (i-1)\frac{\pi}{2}\right] \quad i = 1, 2, 3, 4. \quad (58)$$

The rectangular function is defined as:

$$rect\left(\frac{x}{w}\right) = \begin{cases} 1 & -\frac{w}{2} \leq x \leq \frac{w}{2} \\ 0 & \text{elsewhere} \end{cases}, \quad (59)$$

which gives each of the phase windows a total length equal to the fringe spacing w. For each row in the array of pixels representing the pre-processed image of FIG. 8, equations (56), (58), and (59) are executed using the corresponding x coordinate on the reference plane and the estimated spacing $\overline{w}$ in place of the true spacing w. It will of course be appreciated that, depending upon the resolution of measurement (e.g., the number of pixel elements) and the required resolution for a particular application, it may not be necessary to process every pixel. Similarly, depending upon the amount of the camera's field of view taken up by the object, it may only be necessary to process a portion or region of the image.

Figure 9:
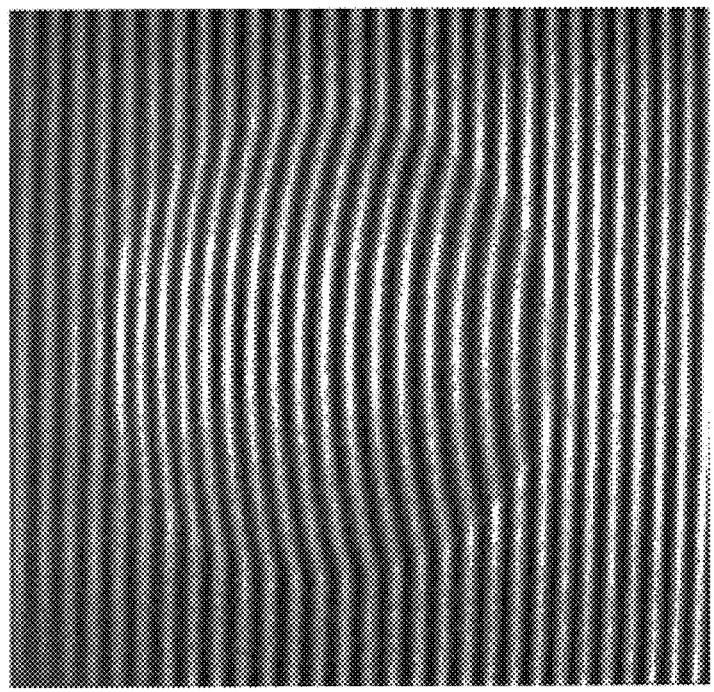
FIG. 9 is a screen shot of a 0° degree phase-shifted fringe pattern generated by correlation integration of the image of FIG. 8.
Figure 10:
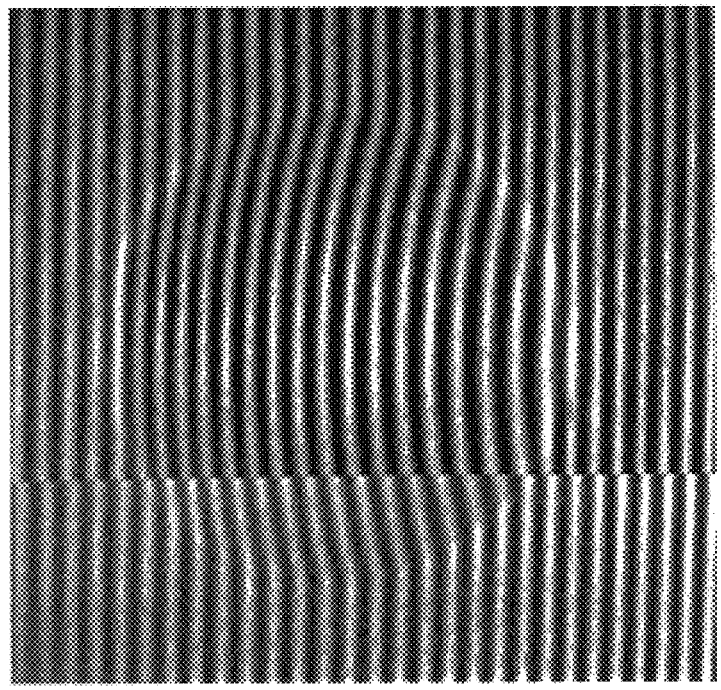
FIG. 10 is a screen shot of the 0° degree phase-shifted fringe pattern of FIG. 9 being overwritten by a 90° phase-shifted fringe pattern generated by correlation integration of the image of FIG. 8.

The result of equation (56) is four phase-shifted image data sets, each of which corresponds to one of the phase shifts. These data sets are each preferably stored and processed logically as an array. The 0° phase-shifted fringe pattern $I_{m1}$ generated using the image of FIG. 8 is depicted in FIG. 9. Also, FIG. 10 shows this 0° phase-shifted fringe pattern being overwritten by the 90° phase-shifted fringe pattern $I_{m2}$.

Once the four phase-shifted fringe patterns are artificially generated using equation (56), the coded phase (i.e., the wrapped phase information) can be calculated at block 46 according to the well-known formula:

$$\phi_m = \arctan \frac{I_{m4} - I_{m2}}{I_{m1} - I_{m3}} \qquad (60)$$

Figure 11:
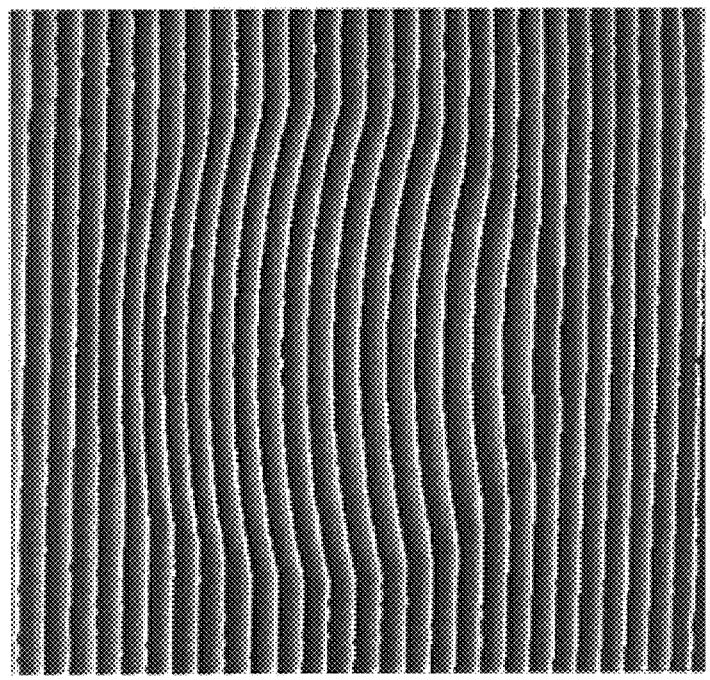
FIG. 11 is a screen shot of the wrapped phase information produced by a phase calculation using the 0° phase-shifted fringe pattern of FIG. 9 along with 90°, 180°, and 270° phase-shifted fringe patterns generated by correlation integration of the image of FIG. 8.
Figure 12:
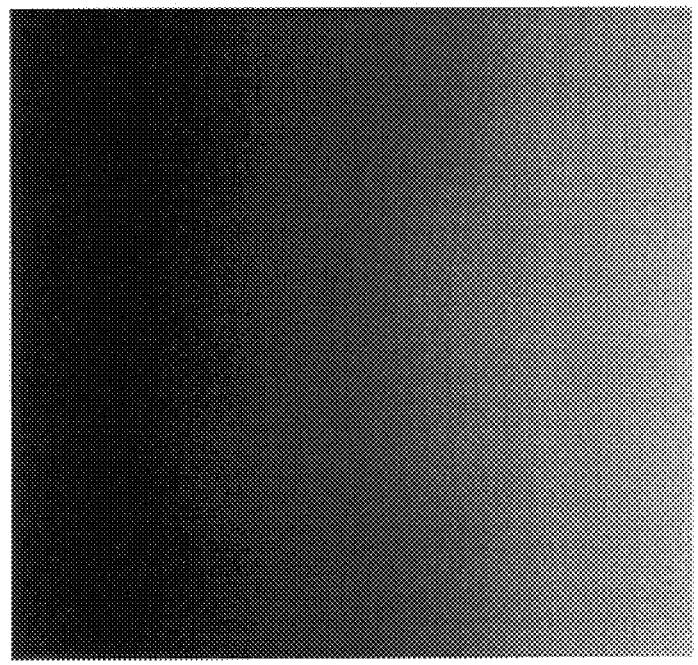
FIG. 12 is a screen shot of the phase information of FIG. 11 after unwrapping.

The resulting wrapped phase information for the illustrated example is shown in FIG. 11. Next, at block 48, this modulated phase can be unwrapped in a conventional manner and then normalized to the pixel bit depth (i.e., the available range of intensity levels, for example, 0–255). This is shown in FIG. 12. This unwrapped phase information is represented by a set of data points that are preferably stored and processed logically if not physically as an array, with each of the data points in this array being associated with at least one of the pixels in the array representing the recorded image. Preferably, there is a one-to-one correspondence between the pixels in the image array and the data points in the array representing the unwrapped phase information, although this is of course not necessary.

At block 50, a check is made to determine if the unwrapped phase information contains an undesirable level of noise. If so, the process moves to block 52 where a noise suppression routine is utilized to improve the signal to noise ratio. This routine is described farther below in connection with FIG. 7. Once the noise suppression has been applied, the process moves back to block 50 to again determine if the noise level is sufficiently small. Thus, noise suppression can be performed multiple times if the noise is heavy. Any of a number of different tests can be used to determine if noise suppression is needed, as will be appreciated by those skilled in the art. For example, a group of adjacent data points can be analyzed to determine the standard deviation among the data points, with the noise suppression being applied if the deviation is too high. Optionally, the entire process of FIG. 6 can be carried out and the resulting 3-D information analyzed to determine if it contains too much noise. If so, then the process of FIG. 6 can be repeated over again with noise suppression (or additional noise suppression) utilized the second time through. Once the noise is determined to be sufficiently low, the process moves to block 54 where the estimated spacing is iteratively updated using a localized curve fitting function. The process then moves to block 56 where a check is made to determine if the estimated spacing $\overline{w}$ needs to be further refined. If so, the process moves back to block 44 for another iteration. If the spacing has sufficiently converged, then the process moves to block 58. The test at block 56 can simply be one which determines whether the estimated spacing has been iteratively updated a preselected number of times (e.g., 2) or can be determined by, for example, checking whether the current estimated spacing is sufficiently close to the last estimated spacing.

The process of updating the estimated spacing at block 54 preferably uses a localized least squares fit as the selected curve fitting function, with the estimated spacing being updated on a pixel-by-pixel basis; that is, the localized least squares fit is applied to each data point within the array of unwrapped phase information to thereby generate a corresponding array of updated estimated spacings, with each estimated spacing in the array being associated with at least one (and preferably one only) of the pixels in the pre-processed image array. For each data point, the localized least squares fit is implemented by defining a regression window centered at the data point. The regression window is a localized portion of the fringe pattern and can comprise a number of data points located within the same row as the data point of interest. Preferably, the regression window has a length w' that is within the range of 0.9 to 1.5 times the fringe spacing and, more preferably, is equal to about 1.2 times the fringe spacing. Mathematically, the length of the regression window is most preferably equal to 1.22 times the fringe spacing, which corresponds to a regression range of 440°. Since the true spacing w is not known, the current value of the estimated fringe spacing $\overline{w}$ can be used during each iteration to determine the length w' of the regression window. If desired, the regression window can also extend in the y-direction; that is, it can include data points in one or more previous and subsequent rows of the array of unwrapped phase information.

The localized least squares fit can be implemented by fitting the coded phase over the regression window to a linear function using the following equation:

$$E = \Sigma (\phi_{mj} - s x_j - g)^2, \qquad (61)$$

where s and g are constants. In this equation, s is the slope of a line that is tangent to the unwrapped phase at the associated data point and the subscript j represents the data points within the regression window. The summation covers all of the data points within the regression window. Taking the partial derivatives of this equation yields:

$$\frac{\partial E}{\partial s} = 0, \frac{\partial E}{\partial g} = 0. \qquad (62)$$

This can be solved for s:

$$s = \frac{N \sum x_j \phi_{mj} - \left(\sum x_j\right)\left(\sum \phi_{mj}\right)}{N \sum x_j^2 - \left(\sum x_j\right)^2}. \qquad (63)$$

The estimated spacing $\overline{w}$ relates to the slope s in the equation:

$$\overline{w} = \frac{2\pi}{s} \qquad (64)$$

Equation (63) can be substituted into equation (64) to obtain the updated estimated spacing:

$$\overline{w} = \frac{2\pi \left[ N \sum x_j^2 - \left(\sum x_j\right)^2 \right]}{N \sum x_j \phi_{mj} - \left(\sum x_j\right)\left(\sum \phi_{mj}\right)}, \qquad (65)$$

where N is the total number of data points in the regression window.

As will be appreciated, the repetition of correlations, phase calculation, and the local least squares fit converges the estimated spacing $\overline{w}$ to the true fringe spacing w. It will be appreciated by those skilled in the art that other curve fitting functions can be utilized in lieu of a least squares fit including, in particular, various linear regression methods.

Once the process has undergone at least one iteration of blocks 44–54 and it is determined at block 56 that no further refinement of the estimated fringe spacing is needed, the process moves to block 58 where the updated spacing is used to generate a new set of unwrapped phase information. This can be done using the same process discussed above in connection with blocks 44–52. Then, the unwrapped phase information determined during this final iteration of phase unwrapping can be used to generate the height information z for each of the data points. Thus, the process moves to block 60 where the modulated phase $\phi_m$ (i.e., the unwrapped phase information) is demodulated using the carrier phase $\phi_r$ determined according to equation (36). This demodulation yields the information phase $\phi_h$ which can be obtained by subtraction on a pixel-by-pixel basis:

$$\phi_h = \phi_m - \phi_r. \quad (66)$$

Figure 13:
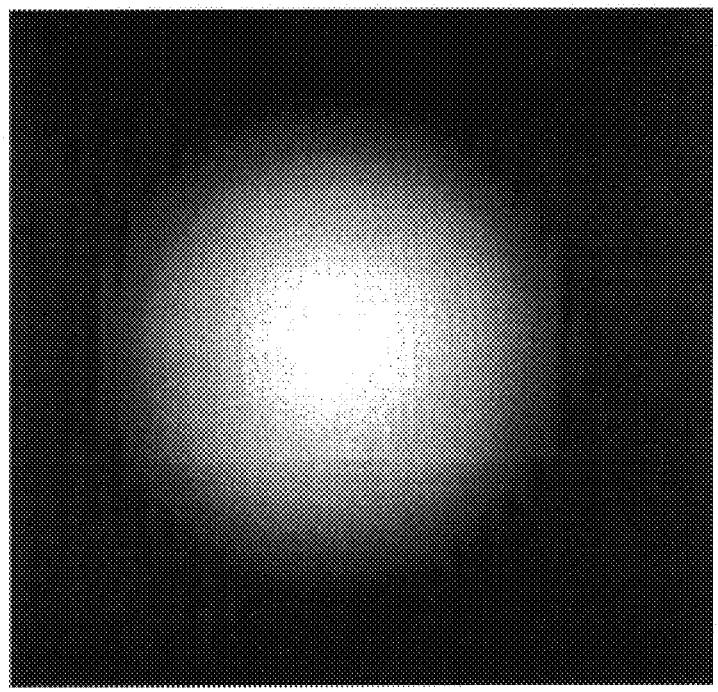
FIG. 13 is a screen shot of the demodulated phase information generated using the unwrapped phase information of FIG. 12.

The information phase $\phi_h$ is shown in FIG. 13 for the sample block.

Once the information phase is obtained, the solution can be improved, if necessary or desired, as indicated at block 62. As with the noise suppression performed at block 52, block 62 can be carried out using the algorithm discussed below in connection with FIG. 7. Finally, at block 64, the height z for each (x,y) data point is calculated using equation (25) (or from equation (22) if linearity is not assumed), following which the actual data points (x',y') associated with each z are determined using equation (54).

Figure 7:
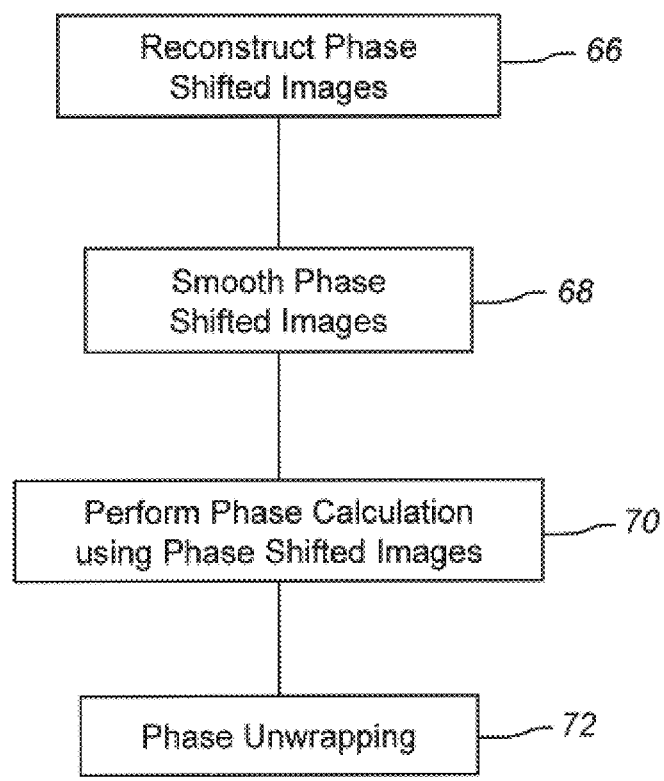
FIG. 7 is a flow chart of a method of noise suppression and post processing used in the routine of FIG. 6.

Referring now to FIG. 7, the process for suppressing noise and improving the phase information at blocks 52 and/or 62 of FIG. 6 will now be described. As indicated at block 66, the first step is to reconstruct four phase-shifted images from $\phi_h$ (or $\phi_m$) using the following equation:

$$I_{hi} = 1 + \cos\left[\phi_h + \frac{\pi}{2}(i-1)\right], \quad i = 1, 2, 3, 4. \quad (67)$$

Figure 14:
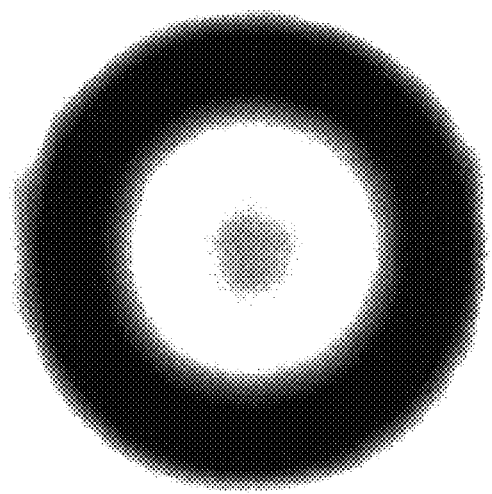
FIG. 14 is a screen shot of a 0° reconstructed pattern generated using the demodulated phase information of FIG. 13.

An exemplary 0° reconstructed pattern is shown in FIG. 14 for the sample block. Next, the four phase-shifted fringe patterns are smoothed, as indicated at block 68. This step can be implemented using the equation:

$$I_{hi\_smooth}(x, y) = I_{hi}(x, y) * circ(x, y), \quad (68)$$

where circ(x,y) is a smoothing window that is usually disk shaped, and * denotes a convolution.

Figure 15:
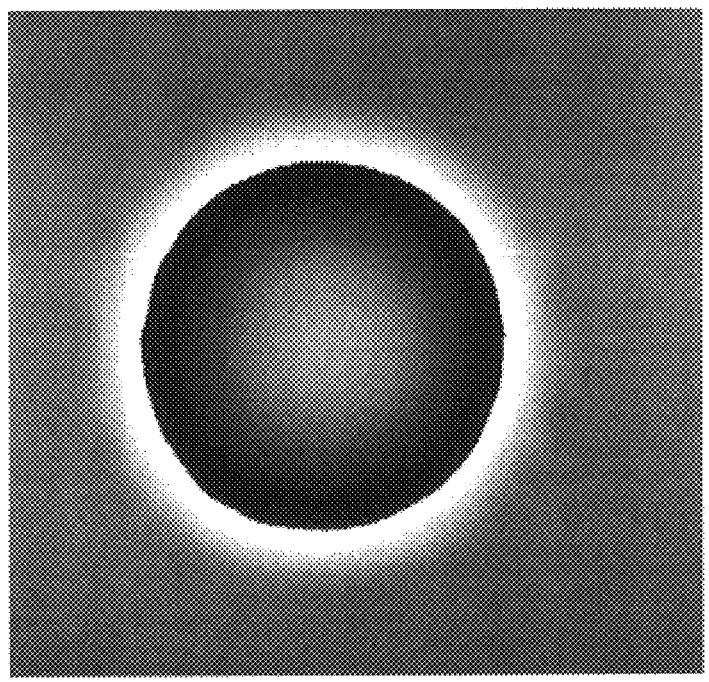
FIG. 15 is a screen shot of the wrapped phase information produced by a phase calculation using the 0° reconstructed pattern of FIG. 14 along with 90°, 180°, and 270° patterns generated by phase-shifted reconstructions of the demodulated phase information of FIG. 13.
Figure 16:
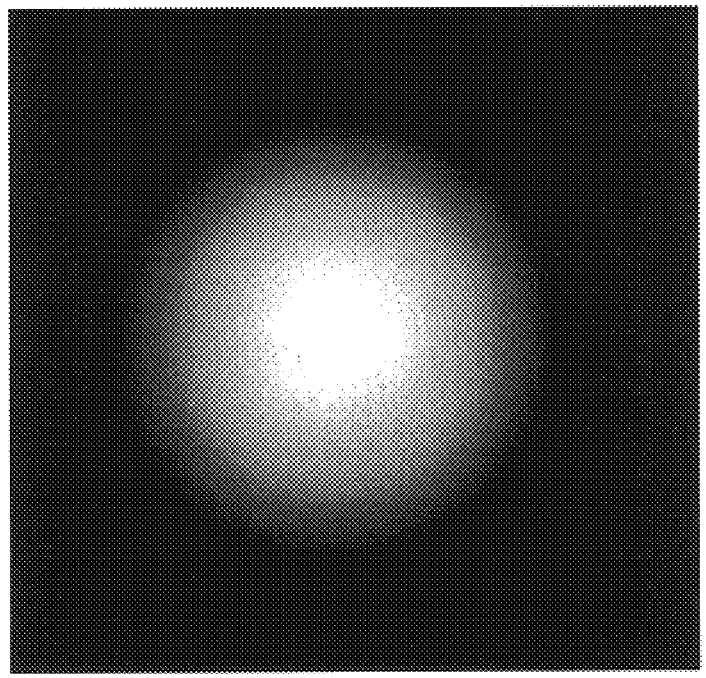
FIG. 16 is a screen shot of the phase information of FIG. 15 after unwrapping.
Figure 17:
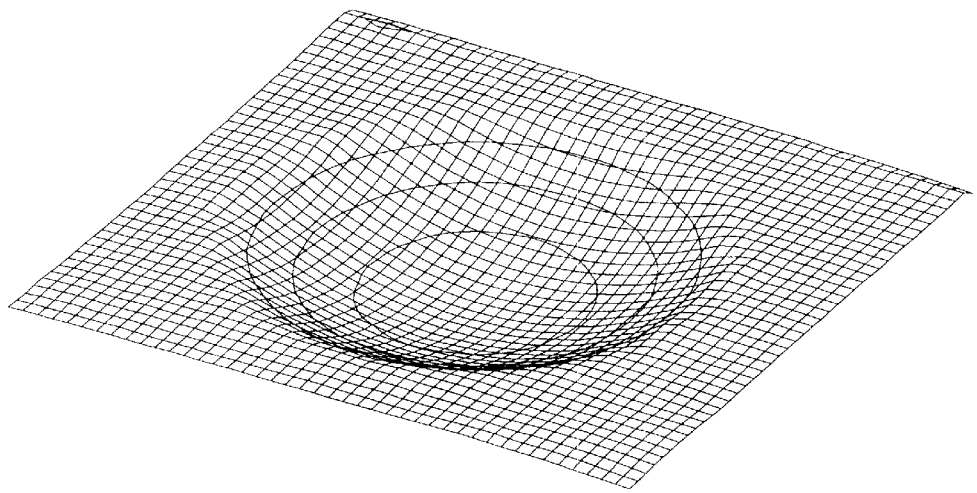
FIG. 17 is a computer-generated 3-D mapping of the specimen block of FIG. 8 using the unwrapped phase information shown in FIG. 16.

A phase calculation is then carried out by putting the smoothed patterns back into equation (60), as indicated at block 70. This produces wrapped phase information, as shown in FIG. 15. Finally, at block 72, the phase is unwrapped, yielding the unwrapped phase information used to update the estimated spacing or, at blocks 60–64 of FIG. 6, to generate the final 3-D information for the object. The unwrapped phase information following block 62 is shown in FIG. 16 for the sample block, and a plot of the resulting 3-D information is shown in FIG. 17.

Figure 18:
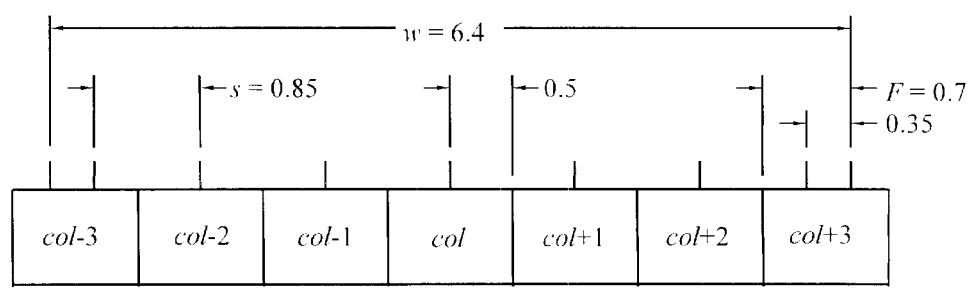
FIG. 18 is a diagram depicting the use of a regression window utilizing fractional pixels for the purposes of the localized curve fitting used by the measurement system of FIG. 1.

In the illustrated embodiment, the recorded image $I_m(x)$ and unwrapped phase information $\phi_m$ are represented by discrete data points while estimated spacing is computed as a decimal number in equation (65). To reduce the error in processing of the fringe patterns, the size of the phase window used in the correlation integration of equation (56) is not simply rounded off to the nearest integer; rather, a fractional pixel analysis is preferably used, as will now be described. Referring now to FIG. 18, seven discrete pixels along a single row of the recorded image array are shown, represented by col-3 ... col+3. The center pixel of the spacing is identified as col. The correlation integration covers a total of w pixels which, in the example illustrated in FIG. 18 is a total of 6.4 pixels. Denote RD as the operation to round down a decimal to an integer. There are:

$$p = 1 + 2RD\left(\frac{w-1}{2}\right) \quad (69)$$

complete pixels. This includes one pixel (col) in the center, q complete pixels on the left, and q complete pixels on the right, where:

$$q = RD\left(\frac{w-1}{2}\right). \quad (70)$$

Additionally, there are two fractional pixels, one on the left end and the other on the right end. The width of the two fractional pixels are:

$$F = \frac{w-p}{2}. \quad (71)$$

The center of the fractional pixel is:

$$t = \frac{F}{2} + 0.5 \quad (72)$$

away from the nearest complete pixel. The contribution from the fractional pixel is weighed by multiplying by F. So, equation (56) for pixel col in the form of a digitized summation is:

$$I_{mi}(col) = FI_{m(col-q-1)}\cos\left[\frac{2\pi(col-q-t)}{w} - (i-1)\frac{\pi}{2}\right] + \quad (73)$$

$$\sum_{j=-q}^{j=q} I_{m(col+j)}\cos\left[\frac{2\pi(col+j)}{w} - (i-1)\frac{\pi}{2}\right] +$$

$$FI_{m(col+q+1)}\cos\left[\frac{2\pi(col+q+t)}{w} - (i-1)\frac{\pi}{2}\right],$$

$$i = 1, 2, 3, 4.$$

This equation therefore provides a preferred, discrete implementation of equation (56) that can be used to generate the four phase-shifted fringe patterns utilized in the method of FIG. 6.

A similar situation exists when calculating the updated estimated spacing $\overline{w}$ using the local least squares fit of equation (65). In that case, tile length w' of the regression window is initially set equal to $1.22\overline{w}$, which will typically not be an integer number of data points. To perform a fractional data point analysis, a fractional multiplier F' is defined as follows:

$$F' = \frac{w' - 2q' - 1}{2}, \quad (74)$$

where:

$$q' = RD\left(\frac{w'-1}{2}\right). \quad (75)$$

To take account of the left most and right most fractional pixels, equation (61) can be refined:

$$E = F'[\phi_{m(col-q'-1)} - sx_{col-q'-1}g]^2 + \quad (76)$$

$$\sum_{j=-q'}^{j=q'} [\phi_{m(col+j)} - sx_{col+j} - g]^2 +$$

$$F'[\phi_{m(col+q'+1)} - sx_{col+q'+1} - g]^2$$

Partial derivatives of this equation can be taken with respect to s and g, as in equation (62), and then solved for the updated estimated spacing $\overline{w}$ using equation (64) to thereby obtain a refined equation which provides a discrete implementation of equation (65) that can be used with the data points representing the unwrapped phase information.

The image processing technique described above in connection with FIG. 6 has wide applicability to a number of different applications requiring the extraction of information from a fringe pattern. It can be used to process carrier fringe patterns from holographic, moiré, speckle, and other such techniques. The use of a single recorded image with artificially generated phase-shifted fringe patterns permits use of the disclosed method for static, transient, as well as dynamic measurements. Practical applications of the image processing technique include, by way of example only, non-contact measurement of various object properties such as shape, displacement, thickness, and strain. As applied to 3-D contour measurements, it can be used for measurements of wear scar on inserts and other machine tools, determination of the shape and orientation of various components, and a variety of dynamic measurement problems such as are needed in car crash evaluation. Moreover, the image processing method disclosed herein can be used for fluid measurements, including such things as velocity, pressure and, for lubricants, film thickness and viscosity.

The method has strong noise suppression ability because the correlation calculation is an integration. Although the correlation is a one dimensional operation, a window that covers several consecutive lines can be used to enhance the noise suppressing ability of the method. This is especially helpful in processing speckle patterns. The correlation serves not only as an artificial phase shift, but also as a smoothing operation. The combination of phase window correlation and local least square fit suppresses the mismatch caused by the difference between the reference spacing and true fringe spacing. While the iteration of the correlation integration, phase calculation, and regression cannot remove all of the error, it does lead to a quick convergence. Two iterations are typically sufficient for finding accurate results. The method does not require high fringe density and the carrier can be some function other than a linear or bilinear function. Furthermore, the method is faster in calculation than the FTM method and produces more accurate results.

Non-linearity is a source of error and, the larger the information phase included in the coded phase, the larger the error. This results because the linear portion from the carrier phase comprises a smaller percentage of the total phase. Also, since the information phase is the difference between the coded phase and the carrier phase, the round-off error can be large if the carrier phase is too large. However, it has been determined that if the coded fringe spacing is within half and double of the pure carrier fringe spacing (as are most carrier patterns), the overall error introduced by the method is only about 1%. The initial estimated spacing does not have to be accurate, which makes automation of the method easier.

It will thus be apparent that there has been provided in accordance with the present invention an image processing method and 3-D contour measurement system which achieve the aims and advantages specified herein. It will, of course, be understood that the foregoing description is of a preferred exemplary embodiment of the invention and that the invention is not limited to the specific embodiment shown. Various changes and modifications will become apparent to those skilled in the art. For example, although the correlation integration of equation (56) utilizes quadrature phase shifts to produce four phase-shifted fringe patterns, it will be appreciated that any number v of equally-spaced phase shifted fringe patterns could be generated by the correlation calculation. All such variations and modifications are intended to come within the scope of the appended claims.

What is claimed is:

1. An image processing method for extracting information from a fringe pattern produced by an optical measurement of an object, comprising the steps of:
   (a) recording a single image of the fringe pattern;
   (b) determining one or more estimated fringe spacings using fringe lines contained within the image;
   (c) generating a plurality of phase-shifted image data sets using the image and the estimated fringe spacing(s);
   (d) generating wrapped phase information using the phase-shifted image data sets;
   (e) unwrapping the phase information and generating a set of data points representative of the unwrapped phase information;
   (f) performing at least one iteration of the following steps (f1) and (f2):
      (f1) determining an updated estimated fringe spacing for each of a number of the data points using a curve fitting function; and
      (f2) repeating steps (c), (d) and (e) using the updated estimated fringe spacings; and
   (g) generating output data representing information contained in the fringe pattern using the unwrapped phase information determined during the final iteration of step (e).

2. The method of claim 1, wherein step (f1) further comprises generating a set of updated estimated fringe spacings by applying a local least squares fit to at least some of the data points.

3. The method of claim 1, wherein step (a) further comprises recording the image as a set of pixel data points, each of which has an associated intensity value.

4. The method of claim 1, wherein step (b) further comprises determining the estimated fringe spacing by finding the average fringe spacing between a plurality of adjacent fringe lines.

5. The method of claim 1, further comprising the step of generating the fringe pattern using a projection moiré technique.

6. The method of claim 1, further comprising the step of generating the fringe pattern using a speckleometry technique.

7. The method of claim 1, further comprising the step of generating the fringe pattern using a holographic technique.

8. The method of claim 1, wherein step (a) further comprises recording an image of a fringe pattern that contains information relating to the surface contour of the object.

9. The method of claim 1, wherein step (a) further comprises recording an image of a fringe pattern that contains information relating to displacement of the object.

10. The method of claim 1, wherein the fringe pattern comprises a plurality of alternating bands of light, whereby the fringes contained within the image comprise alternating bands of light having a spacing that is dependent upon the information contained within the fringe pattern.

11. An image processing method for extracting information from a fringe pattern produced by an optical measurement of an object, comprising the steps of:
   (a) recording an image of the fringe pattern;
   (b) determining one or more estimated fringe spacings using fringe lines contained within the image;
   (c) generating a plurality of phase-shifted image data sets using the image and the estimated fringe spacing(s);

(d) generating wrapped phase information using the phase-shifted image data sets;

(e) unwrapping the phase information and generating a set of data points representative of the unwrapped phase information;

(f) performing at least one iteration of the following steps (f1) and (f2):

(f1) determining an updated estimated fringe spacing for each of a number of the data points using a curve fitting function, wherein the curve fitting function comprises a curve fitting function that, for each selected one of the data points, is applied to a localized group of data points, wherein the localized group of data points comprise a plurality of the data points that, along with the selected data point, together correspond to a localized portion of the image; and (f2) repeating steps (c), (d) and (e) using the updated estimated fringe spacings; and (g) generating output data representing information contained in the fringe pattern using the unwrapped phase information determined during the final iteration of step (e).

12. The method of claim 11, wherein:

step (a) further comprises logically representing the image as a first array of pixels, and step (e) further comprises logically representing the unwrapped phase information as a second array that contains the data points, wherein each of the data points in the second array is associated with at least one of the pixels in the first array.

13. The method of claim 12, wherein each data point is located at a position within the second array that corresponds to the position of the associated pixel(s) in the first array, and wherein, for each selected data point, the localized group of data points comprises a plurality of consecutive data points located in at least one of the rows of the second array.

14. The method of claim 12, wherein step (f1) further comprises generating a third array containing updated estimated spacings, with each updated estimated spacing being associated with at least one of the pixels in the first array and wherein step (c) further comprises generating the plurality of phase-shifted image data sets using at least some of the pixels from the first array along with their associated updated estimated spacings from the third array.

15. The method of claim 11, wherein the localized group of data points comprises a regression window having a length that is between 0.9 $\bar{w}$ and 1.5 $\bar{w}$, where $\bar{w}$ is the estimated fringe spacing.

16. The method of claim 15, wherein the length of the regression window is about 1.2 $\bar{w}$.

17. The method of claim 11, wherein step (f1) further comprises updating the estimated spacing $\bar{w}$ using the equation:

$$\bar{w} = \frac{2\pi[N\sum x_j^2 - (\sum x_j)^2]}{N\sum x_j \phi_{mj} - (\sum x_j)(\sum \phi_{mj})},$$

where:

$X_j$ represents the $j^{th}$ data point in the localized group of data points;

$\phi_{mj}$ represents the modulated phase for the $j^{th}$ data point; and

N represents the number of data points in the group of data points.

18. The method of claim 17, wherein the localized group of data points comprises a regression window having a length that spans a number of complete data points plus a fractional data point at each end of the window and wherein step (f1) further comprises calculating the updated estimated spacing using a discrete implementation of the equation, with the discrete implementation utilizing both the complete and fractional data points.

19. An image processing method for extracting information from a fringe pattern produced by an optical measurement of an object, comprising the steps of:

(a) recording an image of the fringe pattern as a set of pixel data points, each of which has an associated intensity value;

(b) determining one or more estimated fringe spacings using fringe lines contained within the image;

(c) generating a plurality of phase-shifted image data sets using the image and the estimated fringe spacing(s), and calculating a number v of image data sets $I_{m1}$, $I_{m2}$, ... $I_{mv}$, having equally-spaced phase shifts, with the image data sets being generated by a correlation calculation using the equation:

$$I_{mi}(x) = I_m(x) \otimes h_i(x), \; i=1,2,\ldots,v,$$

where:

$I_m(x)$ represents the intensity values of the pixel data points of the image in a direction x that is generally perpendicular to the direction of the fringe lines, and $h_i(x)$ represents a phase window that is a function of the fringe spacing;

(d) generating wrapped phase information using the phase-shifted image data sets;

(e) unwrapping the phase information and generating a set of data points representative of the unwrapped phase information;

(f) performing at least one iteration of the following steps (f1) and (f2):

(f1) determining an updated estimated fringe spacing for each of a number of the data points using a curve fitting function; and (f2) repeating steps (c), (d) and (e) using the updated estimated fringe spacings; and (g) generating output data representing information contained in the fringe pattern using the unwrapped phase information determined during the final iteration of step (e).

20. The method of claim 19, wherein the phase window has a length that spans a number of complete pixel data points plus a fractional pixel data point at each end of the phase window and wherein step (c) further comprises calculating the image data sets using a discrete implementation of the equation, with the discrete implementation utilizing both the complete and fractional pixel data points.

21. The method of claim 19, wherein $h_i(x)$ includes a trigonometric function f(w, x, i) having the form $$f\left[\frac{2\pi x}{w} - (i-1)\frac{\pi}{2}\right],$$

where w represents the fringe spacing for a particular pixel data point and i=1, 2, ... v.

22. An image processing method for extracting information from a fringe pattern produced by an optical measurement of an object, comprising the steps of:

(a) recording an image of the fringe pattern;
(b) determining one or more estimated fringe spacings using fringe lines contained within the image;
(c) generating a plurality of phase-shifted image data sets using the image and the estimated fringe spacing(s);
(d) generating wrapped phase information using the phase-shifted image data sets;
(e) unwrapping the phase information and generating a set of data points representative of the unwrapped phase information;
(f) performing at least one iteration of the following steps (f1) and (f2):
  (f1) determining an updated estimated fringe spacing for each of a number of the data points using a curve fitting function and carrying out the following steps for each selected one of the data points:
    (f1a) determining a curve using a curve fitting function and a group of data points that, along with the selected data point, correspond to a portion of the image; and
    (f1b) determining an updated estimated spacing associated with the selected data point, wherein the associated estimated spacing is related to the slope of a line that is tangent to the curve at the selected data point; and
  (f2) repeating steps (c), (d) and (e) using the updated estimated fringe spacings; and
(g) generating output data representing information contained in the fringe pattern using the unwrapped phase information determined during the final iteration of step (e).

23. The method of claim 22, further comprising carrying out step (f1) for each of the data points.

24. An image processing method for extracting information from a fringe pattern produced by an optical measurement of an object, comprising the steps of:
(a) recording an image of the fringe pattern;
(b) determining one or more estimated fringe spacings using fringe lines contained within the image;
(c) generating a plurality of phase-shifted image data sets using the image and the estimated fringe spacing(s);
(d) generating wrapped phase information using the phase-shifted image data sets;
(e) unwrapping the phase information and generating a set of data points representative of the unwrapped phase information;
(f) performing at least one iteration of the following steps (f1) and (f2):
  (f1) determining an updated estimated fringe spacing for each of a number of the data points using a curve fitting function; and
  (f2) repeating steps (c), (d) and (e) using the updated estimated fringe spacings; and
(g) generating output data representing information contained in the fringe pattern using the unwrapped phase information determined during the final iteration of step (e) and demodulating the unwrapped phase information.

25. The method of claim 24, wherein the fringe pattern has a carrier phase $\phi_r$ and wherein step (g) further comprises demodulating the unwrapped phase information using the equation:

$$\phi_h = \phi_m - \phi_r,$$

where:

$\phi_h$ is demodulated phase information that represents the information contained in the fringe pattern; and
$\phi_m$ represents the unwrapped phase information.

26. The method of claim 25, wherein the carrier phase is determined using a least squares fit.

27. An image processing method for extracting information from a fringe pattern produced by an optical measurement of an object, comprising the steps of:
(a) recording an image of the fringe pattern that contains information relating to thickness of the object;
(b) determining one or more estimated fringe spacings using fringe lines contained within the image;
(c) generating a plurality of phase-shifted image data sets using the image and the estimated fringe spacing(s);
(d) generating wrapped phase information using the phase-shifted image data sets;
(e) unwrapping the phase information and generating a set of data points representative of the unwrapped phase information;
(f) performing at least one iteration of the following steps (f1) and (f2):
  (f1) determining an updated estimated fringe spacing for each of a number of the data points using a curve fitting function; and
  (f2) repeating steps (c), (d) and (e) using the updated estimated fringe spacings; and
(g) generating output data representing information contained in the fringe pattern using the unwrapped phase information determined during the final iteration of step (e).

28. An image processing method for extracting information from a fringe pattern produced by an optical measurement of an object, comprising the steps of:
(a) recording an image of the fringe pattern that contains information relating to strain induced within the object;
(b) determining one or more estimated fringe spacings using fringe lines contained within the image;
(c) generating a plurality of phase-shifted image data sets using the image and the estimated fringe spacing(s);
(d) generating wrapped phase information using the phase-shifted image data sets;
(e) unwrapping the phase information and generating a set of data points representative of the unwrapped phase information;
(f) performing at least one iteration of the following steps (f1) and (f2):
  (f1) determining an updated estimated fringe spacing for each of a number of the data points using a curve fitting function; and
  (f2) repeating steps (c), (d) and (e) using the updated estimated fringe spacings; and
(g) generating output data representing information contained in the fringe pattern using the unwrapped phase information determined during the final iteration of step (e).

29. A method for optical measurement of the surface contour of an object, comprising the steps of:
(a) projecting a fringe pattern of light onto an object along a projection axis;
(b) sensing a single image of the light reflected from the object at an angle relative to the projection axis;
(c) determining one or more estimated fringe spacings using fringe lines contained within the image;
(d) generating a plurality of phase-shifted image data sets using the image and the estimated fringe spacing(s);

(e) generating wrapped phase information using the phase-shifted image data sets;

(f) unwrapping the phase information and generating a set of data points representative of the unwrapped phase information;

(g) performing at least one iteration of the following steps (g1) and (g2):

(g1) determining an updated estimated fringe spacing for each of a number of the data points using a curve fitting function; and (g2) repeating steps (d), (e) and (f) using the updated estimated fringe spacings; and (h) generating height information for the object using the unwrapped phase information determined during the final iteration of step (f).

30. The method of claim 29, wherein step (g1) further comprises generating a set of updated estimated fringe spacings by applying a local least squares fit to at least some of the data points.

31. The method of claim 29, wherein step (c) further comprises determining the estimated fringe spacing by finding the average fringe spacing between a plurality of adjacent fringe lines.

32. The method of claim 29, wherein the fringe pattern comprises a plurality of alternating bands of light, whereby the fringes contained within the image comprise alternating bands of light having a spacing that is dependent upon the surface contour of the object.

33. A method for optical measurement of the surface contour of an object, comprising the steps of:

(a) projecting a fringe pattern of light onto an object along a projection axis;

(b) sensing an image of the light reflected from the object at an angle relative to the projection axis;

(c) determining one or more estimated fringe spacings using fringe lines contained within the image;

(d) generating a plurality of phase-shifted image data sets using the image and the estimated fringe spacing(s);

(e) generating wrapped phase information using the phase-shifted image data sets;

(f) unwrapping the phase information and generating a set of data points representative of the unwrapped phase information;

(g) performing at least one iteration of the following steps (g1) and (g2):

(g1) determining an updated estimated fringe spacing for each of a number of the data points using a curve fitting function, wherein the curve fitting function comprises a curve fitting function that, for each selected one of the data points, is applied to a localized group of data points, wherein the localized group of data points comprise a plurality of the data points that, along with the selected data point, together correspond to a localized portion of the image; and (g2) repeating steps (d), (e) and (f) using the updated estimated fringe spacings; and (h) generating height information for the object using the unwrapped phase information determined during the final iteration of step (f).

34. The method of claim 33, wherein:

step (b) further comprises logically representing the image as a first array of pixels, and step (f) further comprises logically representing the unwrapped phase information as a second array that contains the data points, wherein each of the data points in the second array is associated with at least one of the pixels in the first array.

35. The method of claim 34, wherein each data point is located at a position within the second array that corresponds to the position of the associated pixel(s) in the first array, and wherein, for each selected data point, the localized group of data points comprises a plurality of consecutive data points located in at least one of the rows of the second array.

36. The method of claim 34 wherein step (g1) further comprises generating a third array containing updated estimated spacings, with each updated estimated spacing being associated with at least one of the pixels in the first array and wherein step (d) further comprises generating the plurality of phase-shifted image data sets using at least some of the pixels from the first array along with their associated updated estimated spacings from the third array.

37. The method of claim 33, wherein the localized group of data points comprises a regression window having a length that is between $0.9\ \overline{w}$ and $1.5\ \overline{w}$, where $\overline{w}$ is the estimated fringe spacing.

38. The method of claim 37, wherein the length of the regression window is about $1.2\ \overline{w}$.

39. A method for optical measurement of the surface contour of an object, comprising the steps of:

(a) projecting a fringe pattern of light onto an object along a projection axis;

(b) sensing an image of the light reflected from the object at an angle relative to the projection axis;

(c) determining one or more estimated fringe spacings using fringe lines contained within the image;

(d) generating a plurality of phase-shifted image data sets using the image and the estimated fringe spacing(s);

(e) generating wrapped phase information using the phase-shifted image data sets;

(f) unwrapping the phase information and generating a set of data points representative of the unwrapped phase information;

(g) performing at least one iteration of the following steps (g1) and (g2):

(g1) determining an updated estimated fringe spacing for each of a number of the data points using a curve fitting function and calculating the updated estimated spacing using an equation that utilizes both the complete and fractional data points, wherein the localized group of data points comprises a regression window having a length that spans a number of complete data points plus a fractional data point at each end of the window; and (g2) repeating steps (d), (e) and (f) using the updated estimated fringe spacings; and (h) generating height information for the object using the unwrapped phase information determined during the final iteration of step (f).

40. A method for optical measurement of the surface contour of an object, comprising the steps of:

(a) projecting a fringe pattern of light onto an object along a projection axis;

(b) sensing an image of the light reflected from the object at an angle relative to the projection axis;

(c) determining one or more estimated fringe spacings using fringe lines contained within the image;

(d) generating a plurality of phase-shifted image data sets using the image and the estimated fringe spacing(s);

(e) generating wrapped phase information using the phase-shifted image data sets;

(f) unwrapping the phase information and generating a set of data points representative of the unwrapped phase information;

(g) performing at least one iteration of the following steps (g1) and (g2):
  (g1) determining an updated estimated fringe spacing for each of a number of the data points using a curve fitting function, and carrying out the following steps for each selected one of the data points:
    (g1a) determining a curve using a curve fitting function and a group of data point that, along with the selected data point, correspond to a portion of the image; and
    (g1b) determining an updated estimated spacing associated with the selected data point, wherein the associated estimated spacing is related to the slope of a line that is tangent to the curve at the selected data point; and
  (g2) repeating steps (d), (e) and (f) using the updated estimated fringe spacings; and (h) generating height information for the object using the unwrapped phase information determined during the final iteration of step (f).

41. The method of claim 40, further comprising carrying out step (g1) for each of the data points.

42. A method for optical measurement of the surface contour of an object, comprising the steps of:

(a) projecting a fringe pattern of light onto an object along a projection axis;

(b) sensing an image of the light reflected from the object at an angle relative to the projection axis;

(c) determining one or more estimated fringe spacings using fringe lines contained within the image;

(d) generating a plurality of phase-shifted image data sets using the image and the estimated fringe spacing(s);

(e) generating wrapped phase information using the phase-shifted image data sets;

(f) unwrapping the phase information and generating a set of data points representative of the unwrapped phase information;

(g) performing at least one iteration of the following steps (g1) and (g2):
  (g1) determining an updated estimated fringe spacing for each of a number of the data points using a curve fitting function; and
  (g2) repeating steps (d), (e) and (f) using the updated estimated fringe spacings; and (h) generating height information for the object using the unwrapped phase information determined during the final iteration of step (f), and generating three-dimensional information by determining, for each of a number of the data points, a z-axis coordinate and corresponding x-axis and y-axis coordinates with each x-axis and y-axis coordinate being determined using the corresponding z-axis coordinate.

* * * * *